United States Patent
Rengasamy et al.

(10) Patent No.: US 10,902,001 B1
(45) Date of Patent: Jan. 26, 2021

(54) CONTACT PRESENCE AGGREGATOR

(71) Applicant: Amazon Technologies, Inc., Seattle, WA (US)

(72) Inventors: Rishi Shankar Rengasamy, Tamil Nadu (IN); Arun Rajendran, Tamil Nadu (IN); Ganesh Basavaraj Mamadapur, Tamil Nadu (IN)

(73) Assignee: Amazon Technologies, Inc., Seattle, WA (US)

(*) Notice: Subject to any disclaimer, the term of this patent is extended or adjusted under 35 U.S.C. 154(b) by 645 days.

(21) Appl. No.: 15/443,569

(22) Filed: Feb. 27, 2017

(51) Int. Cl.
*G06F 16/20* (2019.01)
*G06F 16/2457* (2019.01)
*H04L 29/08* (2006.01)
*H04M 1/27* (2006.01)
*H04M 1/2747* (2020.01)

(52) U.S. Cl.
CPC ........ *G06F 16/2457* (2019.01); *H04L 67/306* (2013.01); *H04M 1/271* (2013.01); *H04M 1/2747* (2020.01); *H04M 2203/2094* (2013.01)

(58) Field of Classification Search
None
See application file for complete search history.

(56) References Cited

U.S. PATENT DOCUMENTS

| | | | | |
|---|---|---|---|---|
| 9,160,605 B1* | 10/2015 | Ducrou | ................ | H04L 63/104 |
| 9,711,148 B1* | 7/2017 | Sharifi | ................ | G10L 17/02 |
| 2008/0112567 A1* | 5/2008 | Siegel | ................ | H04R 1/10 |
| | | | | 381/58 |
| 2014/0295808 A1* | 10/2014 | Ely | ................ | H04M 1/274583 |
| | | | | 455/414.1 |

* cited by examiner

*Primary Examiner* — Kristopher Andersen
(74) *Attorney, Agent, or Firm* — Pierce Atwood LLP

(57) ABSTRACT

Methods and systems for identifying and displaying present contacts associated with a device's group account are described herein. In some embodiments, a contact list associated with a requesting device may be obtained, and group accounts, and in particular group accounts that have granted communications session privileges to the requesting device's group account, may be determined. Presence information associated with each of the group accounts may be determined so as to identify which of the group accounts are currently "present" (e.g., human presence has been detected proximate to a user's device). These group accounts may be aggregated together, and list metadata may be generated indicating which of the contacts are present, and which are not. The list metadata, as well as list data representing the contact list, may then be provided to the requesting device.

22 Claims, 6 Drawing Sheets

CONTACT PRESENCE AGGREGATOR

BACKGROUND

Electronic devices are used each day by some people. Certain electronic devices are capable of being used by multiple users. For instance, a shared electronic device may be used by two or more individuals, such as members of a same family where the shared electronic device is located, or individuals visiting a location where the shared electronic device is located.

DETAILED DESCRIPTION

Figure 1:
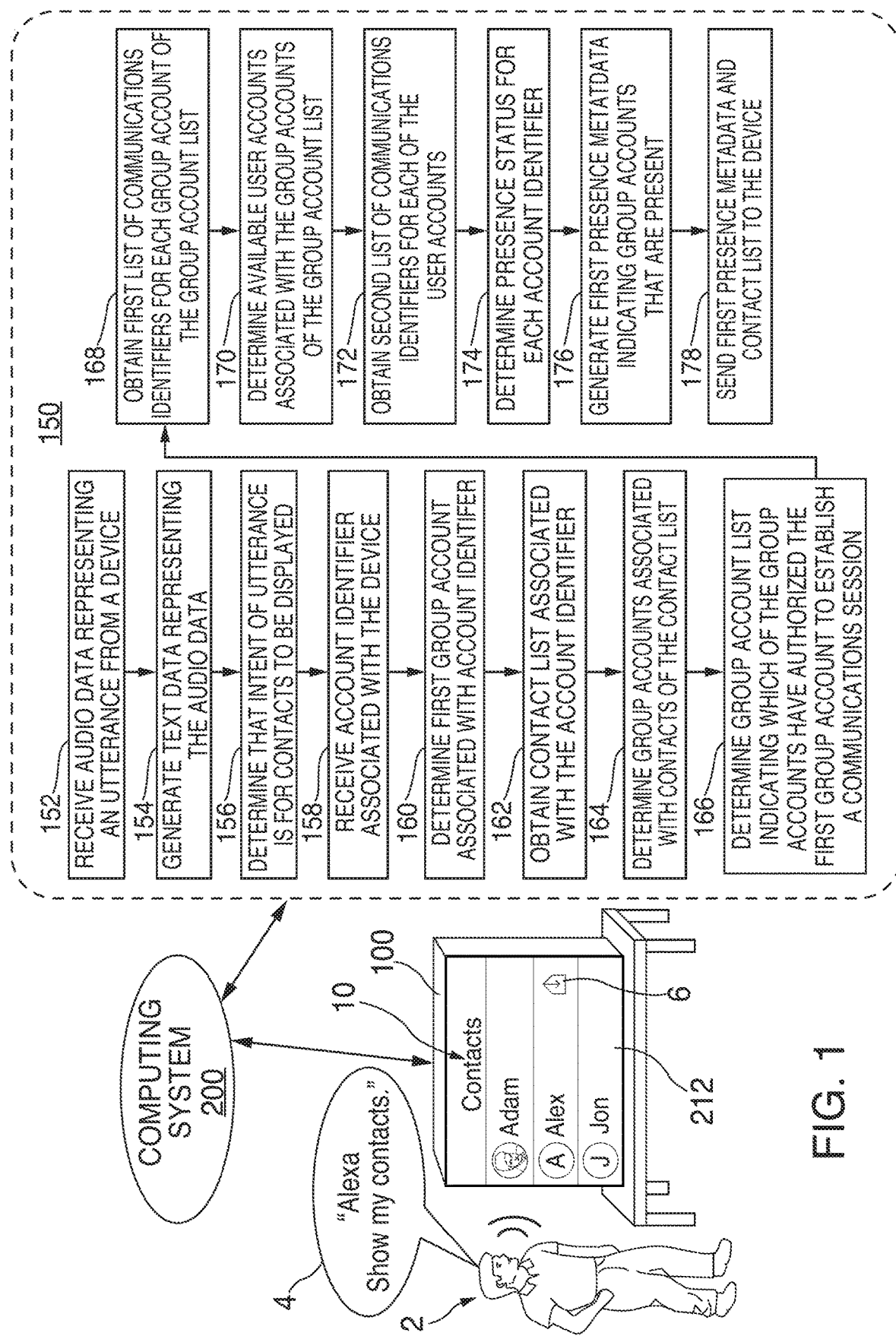
FIG. 1 is an illustrative diagram of an exemplary system for determining present contacts that are capable of having a communications sessions established therewith, in accordance with various embodiments.

The present disclosure, as set forth below, is generally directed to various embodiments of methods and systems for providing an individual with information indicating which of their contacts are currently located proximate to their electronic device and capable of having a communications session established therewith. In some embodiments, speaker identification processing may also be employed to determine whether an utterance, which requests contacts that are currently located proximate to their electronic device be displayed by a requesting device, was spoken by an individual associated with the requesting device's group account, or if the individual is associated with one of the group account's contacts.

Many households, offices, residences, and/or any other space, may include one or more shared electronic devices. For example, a household may include one or more shared voice activated electronic devices. As described herein, a "shared," a "communal," and/or a "multi-user" device may correspond to a device that is capable of being used and interacted with by multiple individuals. Voice activated electronic devices, sound activated electronic device, and/or manually activated electronic devices may all correspond to exemplary types of shared electronic devices. An individual located proximate to such a shared device, in one embodiment, may be capable of interacting with the shared electronic device either via voice, sound, and/or physical input, depending on the particular device's capabilities and configuration. For example, voice activated electronic devices may be used by one or more individuals to facilitate a plethora of actions, such as, and without limitation, outputting content, obtaining information, interacting with additional devices/systems, and/or communicating with other individuals. As an illustrative example, an individual may use their voice activated electronic device to play music, order food, obtain a current weather forecast, and/or communicate with a friend or family member.

In a non-limiting example embodiment, an individual may say, "Alexa, show my contacts," or "Alexa, who are my contacts?", to that individual's voice activated electronic device. In response to determining that the wakeword (e.g., "Alexa") was uttered, the voice activated electronic device may package and send audio data representing the utterance to a computing system. Upon receipt, the computing system, which may include a speech-processing system, may generate text data representing the audio data by performing speech-to-text processing. Using the text data, natural language understanding processing may be used to determine that an intent of the utterance is for that individual's contact list to be displayed. Furthermore, the intent may also include an implicit request to provide information regarding which of those contacts are available for participation in a communications session with the individual, as well as which of those contacts are currently indicated as being "present."

A present contact, as described herein, may correspond to any contact that has determined to be, or likely be, present proximate to their electronic device. The term "proximate," as described herein, may further correspond to any suitable displacement between the electronic device and the individual such that the individual is capable of interacting with the electronic device. For instance, an individual may be proximate to their device so long as an audio input component is capable of detecting audio signals emanating from the individual and/or a manual input component (e.g., a touch screen, button, knob) is capable of being interacted with by the individual. An individual may be considered to be present, for instance, if that individual's electronic device detects human presence. More generally, an individual may be consider proximate to their electronic device when both the user and the electronic device are in a same environment. An individual and electronic device located in a same environment may allow a device, such as a voice activated electronic device, to detect sounds (e.g., a wakeword) spoken by the individual as that individual is likely within "earshot" of the device. For example, an individual and an electronic device may both be located in a same room or physical space, and thus may be considered to be in a same environment. Human presence may be detected in a number of different ways, including, but not limited to, detecting a wakeword or trigger expression for that individual's electronic device, detection of an input (e.g., a button press, knob turn, touch screen being interacted with, etc.), a computer vision system detecting at least a portion of a human body part, device beaconing techniques, and the like. In some embodiments, an individual may be said to be present when activity is detected by that individual's electronic device. For example, the electronic device being caused to output audio content may indicate that the device is "active," and therefore there is a strong likelihood that human presence has also been detected. In some embodiments, a contact may be listed as present so long as a presence confidence score, which indicates a likelihood that someone is present proximate to the contact's device, is greater than a predefined presence confidence score threshold.

In some embodiments, an account identifier associated with the voice activated electronic device may also be received by the computing system. The account identifier may indicate a user account of the computing system that the voice activated electronic device is registered to. For instance, when the voice activated electronic device is first used, the device may be linked to a registered account on the computing system, which may be uniquely identified by the account identifier.

Using the account identifier, a group account associated with the voice activated electronic device may be determined. The group account may correspond to a communications account associated with the shared voice activated electronic device. The group account, in one embodiment, may be associated with one or more user accounts, corresponding to one or more users, of the shared voice activated electronic device. Communications received and/or sent by the group account may be accessible by each user of the one or more user accounts.

A contact list associated with the account identifier may be determined. In some embodiments, the contact list may include one or more contact names—as well as additional contact information (e.g., telephone numbers, mailing addresses, email addresses, etc.)—that an individual has provided. For example, an individual may upload their contact list from their mobile device to a remote computing system, and the contact list may be stored by the computing system for the individual using the account identifier. In some embodiments, the contact list may include contacts from other individuals that also may operate the voice activated electronic device. For example, the group account's contact list may be composed of the contact list of each user account that the group account is associated with. In some embodiments, list data representing the contact list may be generated by the computing system and may be sent to the requesting shared electronic device such that the contact list may be displayed by a display screen associated with the shared electronic device.

In some embodiments, group accounts associated with each contact of the contact list may be determined using a communications account system. For instance, a contact may have his/her own shared electronic device, which may be associated with a different group account. This information may be stored by the communications account system such that group accounts, if available, with contacts of the contact list may be obtained. Furthermore, group accounts that have authorized the first group account such that the first group account is capable of establishing a communications session with those group accounts may be determined. For each of the group accounts that have provided the authorization to the first group account, a communications identifier associated with that group account may be obtained. The communications identifier may indicate an address for a particular communications account such that the requesting shared electronic device and a contact's electronic device may participate in a communications session with one another over a communications network. For instance, the first group account may establish a communications session with another group account such that communications provided by the voice activated electronic device associated with the first group account are routed to a communications identifier associated with the other group account. Further still, a communications identifier may be obtained for each user account associated with a particular group account, such that communications identifiers for every group account and every user account associated therewith that has provided authorization for establishing communications sessions with the first group account may be determined. In some embodiments, list metadata indicating which contacts have group accounts registered on the communications system, as well as indicating which contacts have granted the requesting device's group account permission to establish a communications session with that contact's group account may be generated. The list metadata, for instance, may be sent to the requesting shared electronic device such that, when the contact list is displayed, the contacts that have group accounts are indicated, and of those group accounts, the ones that have authorized the requesting device's group accounts are also indicated for the requester.

In some embodiments, a presence status may be determined for each user communications identifier and/or group account communications identifier. The presence status may indicate whether a device associated with a particular user account (or group account) has recently detected human presence, indicating that a human is likely located proximate to that device. As described herein, a group account may be said to be "present" if a corresponding electronic device associated with that group account has a presence confidence score that is greater than (or equal to) a predefined presence confidence threshold. For example, if an individual speaks an utterance to their electronic device, or more generally interacts with their electronic device, then the device may register that interaction as an activity or presence event. This may indicate that the individual is, at the time of the interaction, substantially proximate to the electronic device. At that moment, the presence confidence score may be a first value, such as 1.0 or 100%. If the predefined presence confidence threshold is 0.5 or 50%, for example, then this may indicate that an individual is likely located nearby the electronic device. In some embodiments, the presence confidence score may decrease in value over time if no additional interactions with the electronic device occur. For example, the presence confidence score may decay to 0.0 (or 0%) over a period of time. In this way, a device may be said to currently be detecting human presence so long as the presence confidence score remains greater than the predefined presence confidence threshold. Persons of ordinary skill in the art will recognize that any suitable technique for measuring activity, and thus presence, nearby/for an electronic device may be employed including, but not limited to, detection of a wakeword or trigger expression, detection or an input (e.g., a touch input, a button press, a knob turn, etc.), computer vision recognizing an individual's presence within a camera's line of sight, a motion sensor detecting motion, and/or mobile device beaconing (e.g., an RSSI being in excess of an RSSI threshold).

Presence metadata indicating which group accounts are "present" and which group accounts are "not present" may be generated based on the presence status of each user communications identifier and/or group account communications identifier. The presence metadata and the contact list may then be sent to the requesting voice activated electronic device. In this way, in response to an individual requesting that their contacts be displayed (e.g., "Alexa, show my contacts"), the computing system may display a graphical user interface ("GUI") that displays some or all of the individual's contacts, as well as an indication of which of those contacts are available for establishing a communications session with.

In some embodiments, speaker identification processing may be employed by the computing system to determine a particular user that spoke an utterance, such as a request to display contacts. In this particular scenario, the speaker identification processing may determine whether or not the speaker is associated with a user of the requesting device. For example, if an individual associated with one of the user accounts of the requesting device is identified, then the when the present contacts are provided to the requesting device, that individual's most frequently communicated with contacts may be displayed first, and contacts that the individual communicates with least often may be displayed afterword. In one embodiment, ranking metadata may be generated that indicates which contacts of the contact list are most frequently communicated with by the individual, such that the contact list, upon being displayed by the requested device, lists the contacts of the contact list in order from most frequently communicated with, to least frequently communicated with.

In one illustrative embodiment, speaker identification processing may determine that the utterance was spoken by an individual associated with a different group account than that of the requesting device. For instance, if a contact of the individual speaks an utterance to the requesting device, the speaker identification processing may determine that the person that spoke the utterance corresponds to a particular contact from the contact list. In this particular scenario, a contact list for the speaker, as well as the contacts from that contact list that have group accounts on the communications system, have granted authorization to the group account associated with the speaker, and are determined to be active, may be obtained and provided to the requesting device. In this way, an individual may be able to establish communications sessions with one or more of their contacts even if that individual is located proximate to another individual's voice activated electronic device.

In some embodiments, a shared device, such as the shared devices described above, may correspond to sound controlled electronic device. One type of sound controlled electronic device may be a voice activated electronic device, which may be capable of being activated in response to a wakeword being uttered. In response to determining that a wakeword has been uttered, the voice activated electronic device may, in some embodiments, send the audio data representing a spoken utterance subsequently following the wakeword to a speech-processing system for processing and analyzing the audio data. The speech-processing system may then generate and send a response to the voice activated electronic device, as well as, or alternatively, communicate with one or more additional systems for obtaining content to be rendered by the voice activated electronic device, and/or may cause one or more additional electronic devices to output content and/or perform a particular action (e.g., turn on a light, preheat an oven, etc.). Additionally, the voice activated electronic device may store one or more wakewords within its local memory. If a determination is made that audio data received from the audio input devices (e.g., microphones) matches the wakeword, the voice activated electronic device may begin sending audio data representing some or all of the audio captured by the voice activated electronic device to the speech-processing system.

Spoken voice commands, in some embodiments, may be prefaced by a wakeword, which may also be referred to as a trigger expression, wake expression, or activation word. In response to detecting the wakeword being uttered, a voice activated electronic device may be configured to detect and interpret any words that subsequently follow the detected wakeword as actionable inputs or commands. In some embodiments, the voice activated electronic device may be activated by a phrase or grouping of words, which the voice activated device may also be configured to detect. The voice activated device, therefore, may also be able to detect and interpret any words subsequently following that phrase or grouping of words.

As used herein, the term "wakeword" may correspond to a "keyword" or "key phrase," an "activation word" or "activation words," or a "trigger," "trigger word," or "trigger expression." One exemplary wakeword may be a name, such as the name, "Alexa," however persons of ordinary skill in the art will recognize that the any word (e.g., "Amazon"), or series of words (e.g., "Wake Up" or "Hello, Alexa") may alternatively be used as the wakeword. Furthermore, the wakeword may be set or programmed by an individual operating a voice activated electronic device, and in some embodiments more than one wakeword (e.g., two or more different wakewords) may be available to activate a voice activated electronic device. In yet another embodiment, the trigger that is used to activate a voice activated device may be any series of temporally related sounds.

As used herein, the term "utterance" may correspond to a spoken word, statement, or sound. In some embodiments, an utterance may include the wakeword followed by an invocation, such as a request, question, or command. In this particular instance, the utterance may begin with the wakeword being spoken, and may end when a last word, phoneme, or sound is spoken. For example, an utterance may correspond to the question, "Alexa—What is the weather currently like?" As another example, an utterance may be, "Alexa—Play my workout music." Further still, an utterance, which need not include the wakeword, may be, "Turn up the volume" or "Call mom."

Another type of sound controlled electronic device may be a sound activated electronic device. Such sound activated electronic device may function similarly to voice activated electronic devices, except that, for sound activated electronic devices, the trigger may be a non-verbal sound. For example, the sound of a door opening, an alarm going off, glass breaking, a telephone ringing, or any other sound may alternatively be used to activate a sound controlled electronic device. In this particular scenario, detection of a non-verbal sound may occur in a substantially similar manner as that of a verbal wakeword for a voice activated electronic device. For example, the sound of a door opening, when detected, may activate a sound activated electronic device, which in turn may activate a burglar alarm.

In some embodiments, the sound controlled electronic device may also correspond to a manually activated electronic device. A manually activated electronic device, as described herein, may correspond to a device that is capable of being activated in response to a manual input from an individual (e.g., pressing a button, touching a portion of a touch screen, performing an action on a device). For example, a tap-to-talk device is one type of manually activated device. Such tap-to-talk devices, for instance, are capable of obtaining and outputting audio data in response to a button being pressed by an individual. In some embodiments, a sound controlled electronic device (e.g., a voice activated electronic device and/or a sound activated electronic device) may include manual activated functionality such that an individual may interact with the device using voice (e.g., speech prefaced by a wakeword), sound (e.g., a particular trigger sound), and/or a manual input (e.g., a button press, a touch of a screen, etc.). However, in some embodiments, an electronic device may be configured to include a single activation functionality (e.g., only voice activated, or only manually activated).

FIG. 1 is an illustrative diagram of an exemplary system for determining present contacts that are capable of having a communications sessions established therewith, in accordance with various embodiments. In a non-limiting example embodiment, process 150 may be performed. Process 150 may begin at step 152. At step 152, audio data representing an utterance may be received by a computing system 200 from a shared voice activated electronic device 100. For instance, an individual 2 may speak an utterance 4, "Alexa, show my contacts," to shared voice activated electronic device 100. Upon determining that a wakeword (e.g., "Alexa") associated with shared voice activated electronic device 100 was uttered, shared voice activated electronic device 100 may begin packing and sending audio data representing utterance 4 to computing system 200. Computing system 200, which is described in greater detail below with reference to FIG. 2, may include, for example, a speech-processing system, a communications system, and a presence tracking system, amongst various other components. Persons of ordinary skill in the art will recognize that utterance 4 is merely one exemplary utterance which may be spoken by individual 2. For example, individual 2 may, alternatively, say such example utterances as "Alexa, who are my contacts?", "Alexa, show my available contacts," or "Alexa, who are my available contacts?"

At step 154, text data representing the audio data may be generated. For instance, upon receipt of the audio data, computing system 200, and in one embodiment, a speech-processing system of computing system 200, may perform automatic speech recognition processing to the audio data to generate text data representing the audio data. At step 156, an intent of utterance 4 may be determined by performing natural language understanding processing to the text data. For example, an intent of utterance 4 may be determined to be a request to display contact data associated with an indication that one or more users are located physically proximate to their corresponding electronic device. The contact data may, therefore, indicate contacts associated within individual 2 that are present, and computing system 200 may be able to use the contact data to generate a graphical user interface ("GUI"), such as GUI 10, to be displayed by a display screen 212 of shared voice activated electronic device 100.

At step 158, an account identifier associated with the device identifier may be received. In some embodiments, the account identifier may be sent by electronic device 100 to computing system 200 at a substantially same time as the audio data. The account identifier may be sent, for example, as metadata appended to the audio data. The account identifier, as described herein, may indicate a particular user account on computing system 200 that electronic device 100 is registered to. For example, when initially setting up electronic device 100, an individual may indicate to computing system 200 that the device is to be registered to that individual's account. Persons of ordinary skill in the art will recognize that in some embodiments a device identifier (e.g., a media access control ("MAC") address, IP address, and/or serial number) associated with electronic device 100 may alternatively be sent to computing system 200 from electronic device 100, and the device identifier may be used to determine the account identifier.

At step 160, a first group account associated with the account identifier may be determined. In one embodiment, in response to receiving the account identifier, computing system 200 may access a communications account system associated with computing system 200 to determine a group account, if available, that is associated with the account identifier. The group account, as described in greater detail below, may correspond to a communications account for the communications system that is associated with shared voice activated electronic device 100. The group account may be accessible by any of the user accounts that are associated with the first group account. For instance, communications sent/received by the first group account may be accessed by any of the user accounts.

At step 162, a contact list associated with the account identifier may be obtained. Upon receiving the account identifier, a communications system associated with computing system 200, which may include a contact management system, may be queried to obtain a contact list that is linked to the received account identifier. The contact list may, in one embodiment, be populated based on contacts associated with each member of the first group account. For example, if the first group account has a first user account and a second user account associated with it, each corresponding to a separate user, then the contact list for the first group account may be generated by combining a first contact list for the first user account and a second contact list for the second user account.

At step 164, group accounts associated with the contacts of the contact list may be determined. For example, a first contact of the contact list may be associated with a second group account, different from the first group account. The first contact may, for instance, have their own communications account on the communications system, and therefore may be associated with that communications account (e.g., the second group account). The second group account may correspond to its own account identifier, and may include one or more user accounts also associated with it. In some embodiments, two or more contacts of the contact list may be associated with a same group account. Thus, in this particular scenario, the same group account may be returned for each of those contacts. For example, if a wife and husband are both contacts of individual 2, then each the wife and husband may correspond to separate entries within the contact list, but may be associated with a same group account. If, however, a particular contact is unassociated with any group accounts, then a null or empty result may be returned for that contact.

At step 166, a group account list indicating which of the group accounts have granted authorization to the first group account (e.g., the group account associated with electronic device 100) such that the first group account is capable of establishing a communications session with those group accounts may be determined. In some embodiments, an individual may authorize certain group accounts so that the contacts associated with those group accounts have permission to initiate and establish a communications session between the individual's electronic device and that contact's electronic device. By granting such permissions, the authorized contacts may be able to establish a communications session with the individual without requiring that the individual "accept," or otherwise approve, the communications session. For example, an individual may authorize a first contact such that the first contact is able to establish a communications session with the individual. During such a communication session, an individual and a contact may exchange communications in a synchronous manner. In response to the first contact speaking a communications session initiation utterance, or pressing a button to start a communications session, a communications session between the first contact's device and the individual's device may be established, and the two devices may be capable of sending/receiving audio and/or video communications to/from one another. By granting the first contact permission to establish the communication session, the individual would not be required to provide explicit approval prior to the communications session starting. Thus, the second list of group accounts may include an indication of which, if any, of the group accounts from the first list of group accounts that have granted this authorization to the first group account. In some embodiments, not every contact of the contact list may have a group account associated therewith, and furthermore, not every group account may be part of the group account list. Thus, the group account list may, in one particular scenario, be associated with the contacts who have a group account and that have also authorized the first group account to initiate and establish a communications session therewith.

At step 168, a first list of communications identifiers for each group account of the group account list may be obtained. In some embodiments, a communications account system of computing system 200 may store communications identifiers for each group account and/or user account. The communications identifier may indicate a communications address that may be used for establishing a communications session with a particular group account. For example, communications identifier may indicate an address of a device associated with a group account that may be used for a sessions initiation protocol ("SIP") communications such that media may be transferred between electronic device 100 and one or more additional devices.

At step 170, available user accounts associated with the group accounts of the group account list may be determined. For example, a group account may have two or more user accounts associated with it, where users of each of the two or more user accounts are capable of accessing communications sent by and/or received by the group account. In some embodiments, one of the user accounts associated with a group account may correspond to the user account that the requesting device is registered to. For example, electronic device 100 may be registered to a first user account. The first group account, which in the exemplary embodiment is associated with electronic device 100, may have the first user account associated therewith such that the first user account is capable of accessing any communications received by the first group account. If, however, there are no user accounts associated with a particular group account then, in one embodiment, a null or empty result for the user accounts may be obtained. At step 172, a second list of communications identifiers for each of the user accounts determined at step 170 may be obtained. In some embodiments, account identifier information associated with each group account of the group account contact list may have been obtained at step 166, and therefore a relationship between a specific customer identifier and an account identifier may be determined after obtaining the first list and the second list.

At step 174, a presence status for each account identifiers may be determined. For instance, a presence status associated with each group account that has granted the first group account authorization to establish communications sessions, as well as any user accounts associated with those group accounts, may be determined. In some embodiments, a presence tracking system, which is described in greater detail below with reference to FIG. 2, may monitor a presence status for various account identifiers. The presence status may indicate whether or not human presence has been detected proximate to a device associated with a particular group account of the group account list within a predefined amount of time of when the audio data was received by computing system 200. If, for example, a shared electronic device had detected human presence, then presence data may be sent to the presence monitoring system indicating that a device associated with a device identifier had detected human presence. The presence tracking system may then determine the account identifier associated with that device, and may indicate the group account associated with that device as being "present." If an individual attempts to establish a communications session with the group account, the communications system will route communications to the shared electronic device, as that is the device that detected presence. In some embodiments, if a personal device detects human presence, then presence data may be sent to the presence monitoring system indicating that the personal device, associated with a different device identifier, has detected presence. The presence tracking system may then determine the account identifier associated with the personal device, and may indicate that the group account associated with that account identifier is also present. If an individual attempts to establish a communications session with the group account, then, in this particular scenario, the communications system may route communications to the personal device, as the personal device detected human presence as opposed to the shared device.

If an individual is currently interacting with their electronic device, then that device may have a presence status of "present." If no one has interacted with a particular electronic device for greater than a predefined amount of time, then that device may have a presence status of "not present." Various events that may trigger presence for an electronic device may include, but are not limited to, a wakeword being uttered, an manual input being detected, an image capturing component detecting at least a portion of a human body part, and/or a mobile device beaconing signal being detected by the electronic device.

A determination may be made for each account identifier as to whether a device associated with that account identifier has detected human presence or a presence event. Each device's presence status may be monitored and tracked by a presence tracking system of computing system 200, and a contact presence aggregator may aggregate all of the contacts that currently indicated as being present. Thus, each time a presence event is detected by a device, that device may send a notification to the presence tracking system to indicate that someone is currently present proximate to that device. In response to receiving the request to display contacts, the contact presence aggregator may aggregate all of the account identifiers whose corresponding group accounts have indicated that human presence had been detected.

At step 176, first presence metadata indicating group accounts that have detected human presence may be generated. In some embodiments, additional presence metadata indicating group accounts that have not detected human presence may also be generated. The additional presence metadata may be provided, for example, by the contact presence aggregator based on the results obtained from the contact presence management system. At step 178, the first presence metadata and the contact list may be sent from computing system 200 to the requesting device (e.g., shared voice activated electronic device 100).

In the illustrative embodiment, a display screen 212 of shared voice activated electronic device 100 may display an exemplary GUI 10 indicating the various contacts of individual 2, as well as which of those contacts are currently "present." In this way, individual 2 may be able to initiate a communications session with those contacts, as opposed to attempting to initiate a communications session with a contact only to find out later on that the contact is not present. For instance, first contact 12, second contact 14, and third contact 16 may each be displayed within GUI 10 on display screen 212. In one embodiment, only second contact 14 may be indicated as being present (e.g., a device associated with a group account of contact 14 had detected human presence within a predefined amount of time of when audio data representing utterance 4 was received by computing system 200). In this particular scenario, a presence indicator 6 may be displayed within GUI 10 for second contact 14 such that individual 2 may be able to see that second contact 14 is currently present proximate to his/her electronic device, and therefore individual 2 may be able to participate in a communications session.

Figure 2:
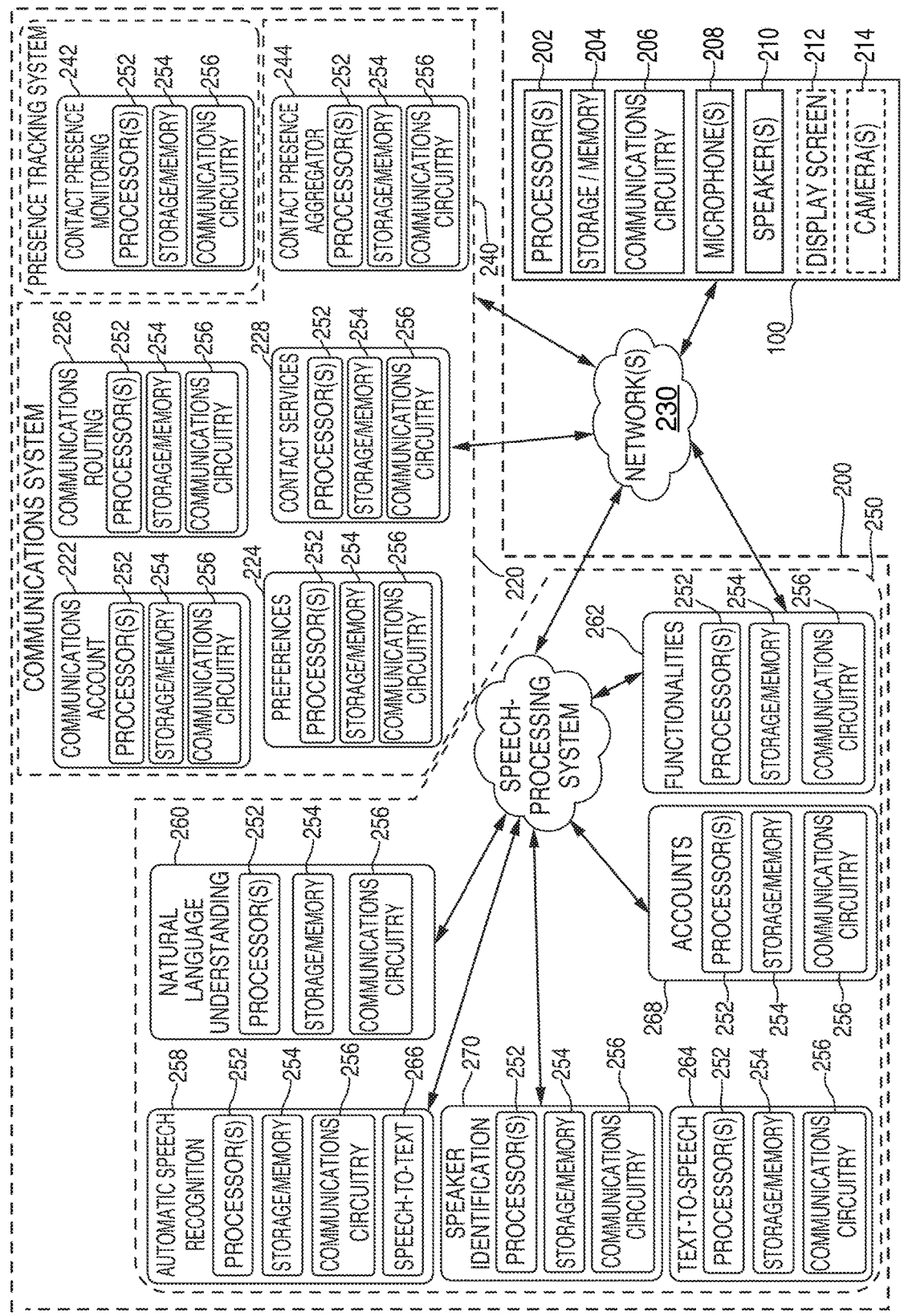
FIG. 2 is an illustrative diagram of the exemplary system architecture of FIG. 1, in accordance with various embodiments.

FIG. 2 is an illustrative diagram of the exemplary system architecture of FIG. 1, in accordance with various embodiments. Shared voice activated electronic device 100 may, in some embodiments, include sound controlled functionality, such as one or more voice or sound activated components. In some embodiments, electronic device 100 may be configured to communicate with computing system 200, and in particular a speech-processing system 250, in response to detecting an utterance including a wakeword, which may subsequently be followed by a request/question/statement. Similarly, electronic device 100 may alternatively or additionally include one or more manually activated components for manually activation functionality. In this particular scenario, electronic device 100 may also be configured, in one embodiment, to communicate with computing system 200, and thus speech-processing system 250, in response to a manual input being detected by one or more input mechanisms, such as a touch screen, a button, and/or a switch, for example.

In a non-limiting embodiment, electronic device 100 may be capable of being activated in response to detecting a specific sound, such as a wakeword, as well as, or alternatively, via one or more inputs. After detecting a specific sound (e.g., a wakeword or trigger expression), electronic device 100 may recognize commands (e.g., audible commands, inputs) within captured audio, and may perform one or more actions in response to the received commands. Furthermore, electronic device 100 may also be configured to perform one or more actions in response to detecting a particular touch, or mechanical, input(s) via electronic device 100.

Electronic device 100 may correspond to any suitable type of electronic device including, but are not limited to, desktop computers, mobile computers (e.g., laptops, ultrabooks), mobile phones, smart phones, tablets, televisions, set top boxes, smart televisions, personal display devices, large scale display devices (e.g., billboards, street signs, etc.), personal digital assistants ("PDAs"), gaming consoles and/or devices, smart furniture, smart household devices (e.g., refrigerators, microwaves, etc.), smart vehicles (e.g., cars, trucks, motorcycles, etc.), smart transportation devices (e.g., ships, trains, airplanes, etc.), wearable devices (e.g., watches, pins/broaches, headphones, etc.), and/or smart accessories (e.g., light bulbs, light switches, electrical switches, etc.). In some embodiments, electronic device 100 may be relatively simple or basic in structure such that no, or a minimal number of, mechanical input option(s) (e.g., keyboard, mouse, track pad) or touch input(s) (e.g., touch screen, buttons) are included. For example, electronic device 100 may be able to receive and output audio, and may include power, processing capabilities, storage/memory capabilities, and communication capabilities. However, in other embodiments, electronic device 100 may include one or more components for receiving mechanical inputs or touch inputs, such as a touch screen and/or one or more buttons.

Electronic device 100, in one embodiment, may include a minimal number of input mechanisms (e.g., a power on/off switch) such that functionality of electronic device 100 may solely or primarily be through audio input and audio output. For example, electronic device 100 may include, or be in communication with, one or more microphones that listen for a wakeword by continually monitoring local audio. In response to the wakeword being detected, electronic device 100 may establish a connection with computing system 200, send audio data to computing system 200, and await/receive a response from computing system 200. In some embodiments, however, non-voice/sound activated devices may also communicate with computing system 200 (e.g., push-to-talk devices). For example, in response to a button or touch screen being pressed, or a button or touch screen being pressed and held, a microphone associated with electronic device 100 may begin recording local audio, establish a connection with computing system 200, send audio data representing the captured audio to computing system 200, and await/receive a response, and/or action to be occur, from computing system 200.

Persons of ordinary skill in the art will recognize that although in the illustrative embodiment computing system 200 includes a speech-processing system 250, a communications system 220, and a presence tracking system 240, this is merely exemplary, and speech-processing system 250, communications system 220, and/or presence tracking system 240 may be separate from computing system 200. For example, speech-processing system 250 may be located within a dedicated computing device or computing system, which may or may not be in communication with computing system 200 and/or one or more additional devices.

Electronic device 100 may include one or more processors 202, storage/memory 204, communications circuitry 206, one or more microphones 208 or other audio input devices (e.g., transducers), one or more speakers 210 or other audio output devices, a display screen 212, and one or more cameras 214 or other image capturing components. However, one or more additional components may be included within electronic device 100, and/or one or more components may be omitted. For example, electronic device 100 may also include a power supply or a bus connector. As still yet another example, electronic device 100 may include one or more additional input and/or output mechanisms, such as one or more buttons, or one or more switches or knobs. Furthermore, while electronic device 100 may include multiple instances of one or more components, for simplicity only one of each component has been shown.

In some embodiments, electronic device 100 may correspond to a manually activated device, or may include the functionality of a manually activated device. A manually activated device, as described herein, may correspond to a device that is capable of being activated in response to a manual input (e.g., pressing a button, touching a portion of a touch screen, performing an action on a device). For example, a tap-to-talk device is one type of manually activated device. Such tap-to-talk devices, for instance, are capable of obtaining and outputting audio data in response to a button being pressed.

In one embodiment, electronic device 100 may be in communication with an additional processing device including one or more of: processor(s) 202, storage/memory 204, communications circuitry 206, microphone(s) 208, speaker(s) 210, display screen 212, and/or camera(s) 214. For example, a centralized control device of electronic device 100 may include one or more microphone(s) 208. These microphone(s) 208 may receive audio input signals, which in turn may be sent to computing system 200 and/or speech-processing system 250 in response to a wakeword engine of electronic device 100 determining that a wakeword was uttered.

Processor(s) 202 may include any suitable processing circuitry capable of controlling operations and functionality of electronic device 100, as well as facilitating communications between various components within electronic device 100. In some embodiments, processor(s) 202 may include a central processing unit ("CPU"), a graphic processing unit ("GPU"), one or more microprocessors, a digital signal processor, or any other type of processor, or any combination thereof. In some embodiments, the functionality of processor(s) 202 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 202 may include its own local memory, which may store program systems, program data, and/or one or more operating systems. However, processor(s) 202 may run an operating system ("OS") for electronic device 100, and/or one or more firmware applications, media applications, and/or applications resident thereon. In some embodiments, processor(s) 202 may run a local client script for reading and rendering content received from one or more websites. For example, processor(s) 202 may run a local JavaScript client for rendering HTML or XHTML content received from a particular URL accessed by electronic device 100.

Storage/memory 204 may include one or more types of storage mediums such as any volatile or non-volatile memory, or any removable or non-removable memory implemented in any suitable manner to store data for electronic device 100. For example, information may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, storage/memory 204 may be implemented as computer-readable storage media ("CRSM"), which may be any available physical media accessible by processor(s) 202 to execute one or more instructions stored within storage/memory 204. In some embodiments, one or more applications (e.g., gaming, music, video, calendars, lists, etc.) may be run by processor(s) 202, and may be stored in memory 204.

In some embodiments, storage/memory 204 may include a media system, which may be configured to facilitate communications between electronic devices 100 and computing system 200. For example, the media system may store one or more communications protocols that may be executed by processor(s) 202 for facilitating communications for device 100. In some embodiments, a sessions initiation protocol ("SIP") may be used to facilitate media transfer between electronic device 100 and one or more of computing system 200 and another electronic device 100. SIP, for example, is an application layer protocol that is text based, and may employ Real-time Transport Protocol ("RTP") or Secure Real-time Transport Protocol ("SRTP") functions. In particular, PJSIP communications functionality may be employed to support audio, video, presence, and messaging communications for electronic device 100. In some embodiments, a Web Real-Time Communications ("WebRTC") protocols may be employed by electronic device 100. In a non-limiting embodiment, the media system may include instructions that indicate which communications protocols to employ for facilitating media transfer between devices based on a device type of electronic device 100. For example, if electronic device 100 does not include display 212 and/or camera 214, then the media system may indicate that PJSIP should be used, whereas if electronic device 100 includes display 212 and/or camera 214 then the media system may indicate that WebRTC protocols should be used.

In some embodiments, storage/memory 204 may include one or more systems and/or databases, such as a speech recognition system, a wakeword database, a sound profile database, and a wakeword detection system. The speech recognition system may, for example, include an automatic speech recognition ("ASR") component that recognizes human speech in detected audio. The speech recognition system may also include a natural language understanding ("NLU") component that determines user intent based on the detected audio. Also included within the speech recognition system may be a text-to-speech ("TTS") component capable of converting text to speech to be outputted by speaker(s) 210, and/or a speech-to-text ("STT") component capable of converting received audio signals into text to be sent to computing system 200 and/or speech-processing system 250 for processing.

The wakeword database may be a database stored locally by storage/memory 204 of electronic device 100, and may include a list of a current wakeword for electronic device 100, as well as one or more previously used, or alternative, wakewords for voice activated electronic device. In some embodiments, an individual may set or program a wakeword for their electronic device 100. The wakeword may be programmed directly on electronic device 100, or a wakeword or wakewords may be set by the individual via a local client application that is in communication with computing system 200 and/or speech-processing system 250. For example, an individual may use their mobile device having the speech-processing system application running thereon to set the wakeword. The specific wakeword may then be communicated from the mobile device to speech-processing system 250, which in turn may send/notify electronic device 100 of the individual's selection for the wakeword. The selected activation may then be stored in the wakeword database of storage/memory 204. In some embodiments, additional trigger expressions or permutations of the wakeword may also be stored within storage/memory 204. For example, specific trigger expressions or words that indicate the presence of the wakeword may also be stored within storage/memory 204. In some embodiments, audio watermarks, indicating a specific action or message, may also be stored within storage/memory 204.

In some embodiments, sound profiles for different words, phrases, commands, or audio compositions are also capable of being stored within storage/memory 204, such as within a sound profile database. For example, a sound profile of audio may be stored within the sound profile database of storage/memory 204 on electronic device 100. In this way, if a particular sound (e.g., a wakeword or phrase) is detected, a corresponding command or request may be ignored, for example. A sound profile, for example, may correspond to a frequency and temporal decomposition of a particular audio file or audio portion of any media file, such as an audio fingerprint or spectral representation.

The wakeword detection system may include an expression detector that analyzes an audio signal produced by microphone(s) 208 to detect a wakeword, which generally may be a predefined word, phrase, or any other sound, or any series of temporally related sounds. Such an expression detector may be implemented using keyword spotting technology, as an example. A keyword spotter is a functional component or algorithm that evaluates an audio signal to detect the presence of a predefined word or expression within the audio signal detected by microphone(s) 208. Rather than producing a transcription of words of the speech, a keyword spotter generates a true/false output (e.g., a logical 1/0) to indicate whether or not the predefined word or expression was represented in the audio signal. In some embodiments, an expression detector may be configured to analyze the audio signal to produce a score indicating a likelihood that the wakeword is represented within the audio signal detected by microphone(s) 208. The expression detector may then compare that score to a wakeword threshold to determine whether the wakeword will be declared as having been spoken.

In some embodiments, a keyword spotter may use simplified ASR techniques. For example, an expression detector may use a Hidden Markov Model ("HMM") recognizer that performs acoustic modeling of the audio signal and compares the HMM model of the audio signal to one or more reference HMM models that have been created by training for specific trigger expressions. An MINI model represents a word as a series of states. Generally, a portion of an audio signal is analyzed by comparing its MINI model to an HMM model of the trigger expression, yielding a feature score that represents the similarity of the audio signal model to the trigger expression model.

In practice, an HMM recognizer may produce multiple feature scores, corresponding to different features of the HMM models. An expression detector may use a support vector machine ("SVM") classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression (e.g., wakeword). Upon declaring that the audio signal represents an utterance of the trigger expression, electronic device 100 may then begin transmitting the audio signal to speech-processing system 250 for detecting and responds to subsequent utterances made by an individual.

In some embodiments, storage/memory 204 may store voice biometric data associated with one or more individuals. For example, an individual that operates electronic device 100 may have a registered user account on computing system 200 (e.g., within accounts system 268). In some embodiments, electronic device 100 may be associated with a group account, and various individuals may have user accounts that are operating under the rules and configurations of the group account. As an illustrative example, voice activated shared electronic device 100 may be associated with a first group account on computing system 200, the first group account being for a family that lives at a household where first shared electronic device is located. Each family member may also have a user account that is linked to the first group account (e.g., a parent, a child, etc.), and therefore each user account may obtain some or all of the rights of the first group account. For example, electronic device 100 may have a first group account on computing system 200 registered to a particular family or group, and each of the parents and children of the family may have their own user account registered under the parent's registered account. In one illustrative embodiment, voice biometric data for each individual may be stored by that individual's corresponding user account. The voice biometric data, for instance, may correspond to a "voice print" or "voice model" of a particular individual, which may be a graphical representation of a person's voice including a frequency decomposition of that individual's voice, acoustic features associated with training data for a particular individual, and/or vectors representing the acoustic features. A more detailed description of speaker identification processing is described below.

Communications circuitry 206 may include any circuitry allowing or enabling one or more components of electronic device 100 to communicate with one another, one or more additional devices, servers, and/or systems. For example, communications circuitry 206 may facilitate communications between electronic device 100 and computing system 200. As an illustrative example, audio data representing an utterance (e.g., utterance 4 of FIG. 1) may be transmitted over a network 230, such as the Internet, to computing system 200 using any number of communications protocols. For example, network(s) 230 may be accessed using Transfer Control Protocol and Internet Protocol ("TCP/IP") (e.g., any of the protocols used in each of the TCP/IP layers), Hypertext Transfer Protocol ("HTTP"), WebRTC, SIP, and wireless application protocol ("WAP"), are some of the various types of protocols that may be used to facilitate communications between electronic device 100 and computing system 200. In some embodiments, electronic device 100 and computing system 200 and/or one or more additional devices or systems (e.g., speech-processing system 250) may communicate with one another via a web browser using HTTP. Various additional communication protocols may be used to facilitate communications between electronic device 100 and computing system 200, including, but not limited to, Wi-Fi (e.g., 802.11 protocol), Bluetooth, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network protocol), infrared, BitTorrent, FTP, RTP, RTSP, SSH, and/or VOIP.

Communications circuitry 206 may use any communications protocol, such as any of the previously mentioned exemplary communications protocols. In some embodiments, electronic device 100 may include an antenna to facilitate wireless communications with a network using various wireless technologies (e.g., Wi-Fi, Bluetooth, radiofrequency, etc.). In yet another embodiment, electronic device 100 may include one or more universal serial bus ("USB") ports, one or more Ethernet or broadband ports, and/or any other type of hardwire access port so that communications circuitry 206 allows electronic device 100 to communicate with one or more communications networks.

Electronic device 100 may also include one or more microphones 208 and/or transducers. Furthermore, one or more microphones located within a separate device may be in communication with electronic device 100 to capture sounds for electronic device 100. Microphone(s) 208 may be any suitable component capable of detecting audio signals. For example, microphone(s) 208 may include one or more sensors for generating electrical signals and circuitry capable of processing the generated electrical signals. In some embodiments, microphone(s) 208 may include multiple microphones capable of detecting various frequency levels. As an illustrative example, electronic device 100 may include multiple microphones (e.g., four, seven, ten, etc.) placed at various positions about electronic device 100 to monitor/capture any audio outputted in the environment where electronic device 100 is located. The various microphones 208 may include some microphones optimized for distant sounds, while some microphones may be optimized for sounds occurring within a close range of electronic device 100. In some embodiments, microphone(s) 208 may only begin to detect audio signals in response to a manual input to electronic device 100. For example, a manually activated device may begin to capture audio data using microphone(s) 208 in response to a user input, such as pressing a button, tapping a touch screen, or providing any touch input gesture to a touch input component.

Electronic device 100 may include one or more speakers 210. Furthermore, electronic device 100 may be in communication with one or more speaker(s) 210. Speaker(s) 210 may correspond to any suitable mechanism for outputting audio signals. For example, speaker(s) 210 may include one or more speaker units, speaker housings, transducers, arrays of speakers, and/or arrays of transducers that may be capable of broadcasting audio signals and or audio content to a surrounding area where electronic device 100 may be located. In some embodiments, speaker(s) 210 may include headphones or ear buds, which may be wirelessly wired, or hard-wired, to electronic device 100, that may be capable of broadcasting audio directly to an individual.

In some embodiments, one or more microphones 208 may serve as input devices to receive audio inputs. Electronic device 100, in the previously mentioned embodiment, may then also include one or more speakers 210 to output audible responses. In this manner, electronic device 100 may function solely through speech or audio, without the use or need for any input mechanisms or displays, however this is merely exemplary.

Display screen 212 may correspond to a display device and/or touch screen, which may be any size and/or shape and may be located at any portion of electronic device 100. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display device including capacitive sensing panels capable of recognizing touch inputs thereon. For instance, display screen 212 may correspond to a projected capacitive touch ("PCT"), screen include one or more row traces and/or driving line traces, as well as one or more column traces and/or sensing lines. In some embodiments, display screen 212 may be an optional component for electronic device 100. For instance, electronic device 100 may not include display screen 212. Such devices, sometimes referred to as "headless" devices, may output audio, or may be in communication with a display device for outputting viewable content.

Display screen 212, in one non-limiting embodiment, may include an insulator portion, such as glass, coated with a transparent conductor, such as indium tin oxide ("InSnO" or "ITO"). In general, one side of the touch screen display may be coated with a conductive material. A voltage may be applied to the conductive material portion generating a uniform electric field. When a conductive object, such as a human finger, stylus, or any other conductive medium, contacts the non-conductive side, typically an outer surface of display screen 212, a capacitance between the object and the conductive material may be formed. Processor(s) 202 may be capable of determining a location of the touch screen associated with where the capacitance change is detected, and may register a touch input as occurring at that location.

In some embodiments, display screen 212 may include multiple layers, such as a top coating layer, a driving line layer, a sensing layer, and a glass substrate layer. As mentioned previously, the glass substrate layer may correspond to an insulator portion, while the top coating layer may be coated with one or more conductive materials. The driving line layer may include a number of driving lines, and the sensing layer may include a number of sensing lines, which are described in greater detail below. Persons of ordinary skill in the art will recognize that one or more additional layers, or spaces between layers, may be included. Furthermore, persons of ordinary skill in the art will recognize that any number of driving lines and sensing lines for driving the line layer and the sensing layer, respectively, may be used.

In some embodiments, the driving lines and the sensing lines of the driving line layer and the sensing line layer, respectively, may form a number of intersection points, where each intersection functions as its own capacitor. Each sensing line may be coupled to a source, such that a charge is provided to each sensing line, and changes in capacitance of a particular driving line and sensing line are detectable thereby. In response to a conductive object being brought proximate, or substantially touching an outer surface of the top coating layer, a mutual capacitance of a particular capacitor (e.g., an intersection point) may reduce in magnitude. In other words, a voltage drop may be detected at a location on display screen 212 corresponding to where a conductive object contacted display screen 212.

A change in capacitance may be measured to determine a location on the touch screen where the object has contacted the surface. For example, if an individual touches a point on display screen 212, then a corresponding driving line and sensing line that intersect at that point may be identified. A location of the point may have one or more pixels associated with that location, and therefore one or more actions may be registered for an item or items that are displayed at that location. Processor(s) 202 of electronic device 100 may be configured to determine which pixels are associated with a particular location point, and which item or items are also displayed at that pixel location. Furthermore, electronic device 100 may be configured to cause one or more additional actions to occur to the item or items being displayed on display screen 212 based on a temporal duration the touch input, and or if one or more additional touch inputs are detected. For example, an object that contacted display screen 212 at a first location may be determined, at a later point in time, to contact display screen 212 at a second location. In the illustrative example, an object may have initially contacted display screen 212 at the first location and moved along a particular driving line to the second location. In this scenario, a same driving line may have detected a change in capacitance between the two locations, corresponding to two separate sensing lines.

The number of driving lines and sensing lines, and therefore the number of intersection points, may directly correlate to a "resolution" of a touch screen. For instance, the greater the number of intersection points (e.g., a greater number of driving lines and sensing lines), the greater precision of the touch input. For instance, a touch screen display screen 212 having 100 driving lines and 100 sensing lines may have 100 intersection points, and therefore 100 individual capacitors, while a touch screen display screen 212 having 10 driving lines and 10 sensing lines may only have 10 intersection points, and therefore 10 individual capacitors. Therefore, a resolution of the touch screen having 100 intersection points may be greater than a resolution of the touch screen having 10 intersection points. In other words, the touch screen having 100 intersection points may be able to resolve a location of an object touching the touch screen with greater precision than the touch screen having 10 intersection points. However, because the driving lines and sensing lines require a voltage to be applied to them, this may also mean that there is a larger amount of power drawn by electronic device 100, and therefore the fewer driving lines and/or sensing lines used, the smaller the amount of power that is needed to operate the touch screen display.

In some embodiments, display screen 212 may correspond to a high-definition ("HD") display. For example, display screen 212 may display images and/or videos of 720p, 1080p, 1080i, or any other image resolution. In these particular scenarios, display screen 212 may include a pixel array configured to display images of one or more resolutions. For instance, a 720p display may present a 1024 by 768, 1280 by 720, or 1366 by 768 image having 786,432; 921,600; or 1,049,088 pixels, respectively. Furthermore, a 1080p or 1080i display may present a 1920 pixel by 1080 pixel image having 2,073,600 pixels. However, persons of ordinary skill in the art will recognize that the aforementioned display ratios and pixel numbers are merely exemplary, and any suitable display resolution or pixel number may be employed for display screen 212, such as non-HD displays, 4K displays, and/or ultra displays.

In some embodiments, electronic device 100 may include one or more cameras 214, corresponding to any suitable image capturing component or components capable of capturing one or more images and/or videos. Camera(s) 214 may, in some embodiments, be configured to capture photographs, sequences of photographs, rapid shots (e.g., multiple photographs captured sequentially during a relatively small temporal duration), videos, or any other type of image, or any combination thereof. In some embodiments, electronic device 100 may include multiple cameras 214, such as one or more front-facing cameras and/or one or more rear facing cameras. Furthermore, camera(s) 214 may be configured to recognize far-field imagery (e.g., objects located at a large distance away from electronic device 100) or near-filed imagery (e.g., objected located at a relatively small distance from electronic device 100). For instance, camera(s) 214 may include computer vision ("CV") functionality that allow for detection of human presence within a captured image. As an illustrative example, camera(s) 214 may receive image data representing an image (or series of images), which electronic device 100 may be configured to analyze to determine whether or not at least a portion of a human body part is included within the image. In some embodiments, the camera(s) may be high-definition ("HD") cameras, capable of obtaining images and/or videos at a substantially large resolution (e.g., 726p, 1080p, 1080i, etc.). In some embodiments, camera(s) 214 may be optional for electronic device 100. For instance, camera(s) 214 may be external to, and in communication with, electronic device 100. For example, an external camera may be capable of capturing images and/or video, which may then be provided to electronic device 100 for viewing and/or processing.

Persons of ordinary skill in the art will recognize that, in some embodiments, display screen 212 and/or camera(s) 214 may be optional for electronic device 100. For instance, electronic device 100 may function using audio inputs and outputting audio, and therefore display screen 212 and/or camera(s) 214 may not be included. Furthermore, in some embodiments, electronic device 100 may not include display screen 212 and/or camera(s) 214, but instead may be in communication with display screen 212 and/or camera(s) 214. For example, electronic device 100 may be connected to a display screen via a Wi-Fi (e.g., 802.11 protocol) connection such that visual content sent to electronic device 100 may be sent to the display screen, and output thereby.

In one exemplary embodiment, electronic device 100 may include an additional input/output ("I/O") interface. For example, electronic device 100 may include one or more input components capable of receiving user inputs. Various types of input components may include, but are not limited to, keyboards, buttons, switches, a mouse, joysticks, or an external controller may be used as an input mechanism for the I/O interface. In some embodiments, the output portion of the I/O interface of electronic device 100 may include one or more lights, light emitting diodes ("LEDs"), or other visual indicator(s). Persons of ordinary skill in the art will recognize that, in some embodiments, one or more features of the output portion of the I/O interface may be included in a purely voice activated version of electronic device 100. For example, one or more LED lights may be included on electronic device 100 such that, when microphone(s) 208 receive audio, the one or more LED lights become illuminated signifying that audio has been received by electronic device 100. In some embodiments, one or more vibrating mechanisms or other haptic features may be included with electronic device 100 to provide a haptic response to an individual.

In some embodiments, electronic device 100 may include radio-frequency identification ("RFID") functionality and/or near field communication ("NFC") functionality. Furthermore, in some embodiments, electronic device 100 may include one or more infrared ("IR") sensors and one or more IR emitters. The IR sensors/emitters may be used to determine depth information. For example, in one embodiment, a distance of an individual from electronic device 100 may be determined using the one or more IR sensors/emitters. Depth determination may be performed using any depth determination technique. In some embodiments, a distance between an individual and electronic device 100 may be employed as a basis for presenting content with varying density using display screen 212. For example, when an individual is at a distance A from electronic device 100, electronic device 100 may display weather data for a current day. However as the user moves closer to electronic device 100, such as at a distance B from electronic device 100, which may be less than distance A, electronic device 100 may display weather data for a current week. Still further, electronic device 100 may include a device beaconing component that is capable of measuring a signal strength of a particular device to determine how close that device is to electronic device 100. For example, electronic device 100 may include a received signal strength indicator ("RSSI") component that measures an RSSI value received from another electronic device, such as a smartphone or tablet. Based on the RSSI value, electronic device 100 may be able to determine how close a particular device is, and thus, how likely an individual associated with that device is to electronic device 100.

Speech-processing system 250, in one embodiment, may include various components and systems including, but not limited to, automatic speech recognition ("ASR") system 258, natural language understanding ("NLU") system 260, functionalities system 262, text-to-speech ("TTS") system 264, accounts system 268, and speaker identification system 270. In some embodiments, speech-processing system 250 may also include computer readable media, including, but not limited to, flash memory, random access memory ("RAM"), and/or read-only memory ("ROM"). Speech-processing system 250 may also include various systems that store software, hardware, logic, instructions, and/or commands for speech-processing system 250, or any other system, or any combination thereof.

ASR system 258 may be configured to recognize human speech in detected audio, such as audio captured by microphone(s) 208, which may then be transmitted to speech-processing system 250. ASR system 258 may include, in one embodiment, one or more processor(s) 252, storage/memory 254, and communications circuitry 256. Processor(s) 252, storage/memory 254, and communications circuitry 256 may, in some embodiments, be substantially similar to processor(s) 202, storage/memory 204, and communications circuitry 206, which are described in greater detail above, and the aforementioned descriptions may apply. In some embodiments, ASR system 258 may include speech-to-text ("STT") system 266. STT system 266 may employ various speech-to-text techniques. However, techniques for transcribing speech into text are well known in the art and need not be described in further detail herein, and any suitable computer implemented speech to text technique may be used to convert the received audio signal(s) into text, such as SOFTSOUND speech processing technologies available from the Autonomy Corporation, which is headquartered in Cambridge, England, United Kingdom.

ASR system 258 may include an expression detector that analyzes audio signals received by speech-processing system 250, such as the expression detector mentioned above with regards to electronic device 100. Such an expression detector may be implemented using keyword spotting technology, as an example. A keyword spotter is a functional component or algorithm that evaluates an audio signal to detect the presence of a predefined word or expression, such as a passphrase or other sound data, within the audio signals. Rather than producing a transcription of words of the speech, a keyword spotter generates a true/false output (e.g., a logical 1/0) to indicate whether or not the predefined word or expression was represented in the audio signal. In some embodiments, an expression detector may be configured to analyze the audio signal to produce a score indicating a likelihood that the wakeword or phrase, is represented within the audio signal. The expression detector may then compare that score to a threshold value to determine whether the wakeword or phrase will be declared as having been spoken.

NLU system 260 may be configured such that it determines user intent based on the received audio data. For example, NLU system 260 may determine that the intent of utterance 4 is for contacts associated with a particular user to be displayed. In response to determining the intent of the utterance, NLU system 260 may communicate the received command to an appropriate subject matter server or skill on functionalities system 262 and/or with one or more of communications system 220 and presence tracking system 240, to perform one or more tasks, and/or retrieve an appropriate response or response information. NLU system 260 may include processor(s) 252, storage/memory 254, and communications circuitry 256 which, in one embodiment, may be substantially similar to processor(s) 202, storage/memory 204, and communications circuitry 206 of electronic device 100, and the previous description may apply.

Functionalities system 262 may, for example, correspond to various action specific systems or servers, sometimes referred to as "skills," capable of processing various task specific actions. Functionalities system 262 may further correspond to first party applications and/or third party applications capable of performing various tasks or actions. For example, based on the context of the audio received from electronic device 100, speech-processing system 200 may use a certain functionality to generate a response, or to obtain response information, which in turn may be communicated back to electronic device 100. For instance, an utterance may ask for weather information, and therefore functionalities system 262 may access a weather application to obtain current weather information for a location associated with electronic device 100. In some embodiments, a communications functionality may be included by functionalities system 262 that, when invoked, causes speech-processing system 250 and communications system 220 to communicate with one another. Functionalities system 262 may also include processor(s) 252, storage/memory 254, and communications circuitry 256. In some embodiments, functionalities system 262 may be capable of communicating with communications system 220 using network(s) 230. For example, functionalities system 262 may be configured, in response to NLU system 260 determining that an intent of an utterance is associated with communications functionality, to access communications system 220 to facilitate the action(s) associated with the intent.

TTS system 264 may employ various text-to-speech techniques. However, techniques for transcribing speech into text are well known in the art and need not be described in further detail herein, any suitable computer implemented speech to text technique may be used to convert the received audio signal(s) into text, such as SOFTSOUND speech processing technologies available from the Autonomy Corporation, which is headquartered in Cambridge, England, United Kingdom. TTS system 264 may also include processor(s) 252, storage/memory 254, and communications circuitry 256.

Accounts system 268 may store one or more user accounts corresponding to users having a registered account on speech-processing system 250. For example, a parent may have a registered account on computing system 200, and each of the parent's children may have their own user account registered under the parent's registered account. In some embodiments, each user account on accounts system 268 may be associated with a particular account identifier. When a request is received by computing system 200, an account identifier associated with the requesting device may be received. Alternatively, a device identifier (e.g., a MAC address, IP address, serial number, etc.) associated with the device may be received, and the device identifier may then be mapped to an account identifier, which may indicate an account that the requesting device is registered to. In some embodiments, accounts system 268 may store voice biometric data representing voice biometric information for a specific user account. For example, acoustic features of a particular individual's voice may be stored for that individual's user account by accounts system 268. This may allow speaker identification techniques (e.g., speaker identification system 270) to be used to determine whether generated vector data representing acoustic features of the audio data corresponds to voice biometric data associated with a specific user account and/or a group account. In some embodiments, accounts system 268 may store a device identifier and/or an account identifier associated with a particular device, a communications identifier associated with a particular user account and/or group account, or any other suitable information, or any combination thereof. Accounts system 266 may also include processor(s) 252, storage/memory 254, and communications circuitry 256

Speaker identification system 270, in some embodiments, may correspond to any suitable device/system capable of identifying a particular person's voice from an audio signal. Speaker identification system 270 may determine whether a current voice being used to speak an utterance matches known voice biometric data associated with a particular individual's voice. In some embodiments, voice biometric data may be stored within accounts system 268 for various individuals having a user account stored thereby. For example, individual 2 may have a user account on computing system 200 (e.g., stored within accounts system 268), which may be associated with electronic device 100. Stored within the user account may be voice biometric data, such as stored vector data representing stored acoustic features associated with a voice of individual 2. Therefore, when an utterance, such as utterance 4, is detected by electronic device 100, and subsequently when audio data representing that utterance is received by computing system 200, speaker identification system 270 may determine whether the voice used to speak utterance 4 matches, to at least a predefined confidence threshold, the stored voice biometric information associated with individual 2 stored by their user account. If so, then this may indicate that individual 2 is the likely speaker of utterance 4.

In some embodiments, speaker identification system 270 may receive audio data representing an utterance, or a copy of the audio data, at a substantially same time as ASR system 258. The audio data may be divided into audio frames representing time intervals, with which a number of values or features representing qualities of the audio data may be determined, along with a set of those values (e.g., feature vectors or audio feature vectors) representing features/qualities of the audio data for each audio frame. For example, each audio frame may include 25 ms of audio, and the frames may start at 10 ms intervals. This may result in a sliding window where adjacent audio frames include 15 ms of overlapping audio. Persons of ordinary skill in the art will recognize that many different acoustic features may be determined, and each feature may be representative of a particular quality of the audio data. Some exemplary approaches that may be used to process the received audio data may include, but art not limited to, mel-frequency cepstral coefficients ("MFCCs"), perceptual linear predictive ("PLP") techniques, neural network feature vector techniques, linear discriminant analysis, and semi-tied covariance matrices. Speaker identification system 270 may also include a scoring component that determines respective confidence scores indicating how likely it is that an input utterance was spoken by a particular user.

When audio data is received by computing system 200, ASR system 258, speaker identification system 270, and/or any other suitable component of speech-processing system 250, may perform windowing functions to the audio data to generate framed audio data. The size of each audio frame may depend on a particular configuration of speech-processing system 250, and persons of ordinary skill in the art will recognize that any audio frame size may be used. For example, as mentioned previously, each audio frame may include 25 milliseconds of audio data, and may overlap with 10 milliseconds of a next audio frame, resulting in a sliding window. Performing a windowing function may include multiplying a time record by a finite-length window with an amplitude that varies smoothly and gradually toward zero at its edges. By performing windowing, endpoints of the waveforms of respective audio frames of audio data meet, resulting in a continuous waveform without sharp transitions. A fast Fourier transform ("FFT") may be performed to convert the waveforms in each audio frame of the framed audio data from its original domain (e.g., time) to a representation in a frequency domain (thereby creating frequency domain framed audio data). Audio processing techniques other than or in addition to FFT may be used to transform audio data (e.g., waveforms) into data that can be processed as needed.

In some embodiments, user recognition feature extraction may be performed on the frequency domain framed audio data. User recognition feature extraction may include performing frame level feature extraction and/or utterance level feature extraction. The frame level feature extraction may determine which frame of a universal background model ("UBM") the frame corresponds to. The UBM may be a Gaussian mixture model, a deep neural network, etc. The utterance level feature extraction may analyze aligned speech frames to derive feature vectors of fixed length (i.e., the user recognition feature/vector data). The feature extraction may continue until voice activity is no longer detected in the input audio data, at which point an endpoint of the speech may be identified and speech processing may end. Feature extraction may, in some embodiments, be performed on all the audio data received from the electronic device 100. Alternatively, feature extraction may only be performed on audio data including speech. Feature extraction and user recognition feature extraction may include determining values (i.e., features) representing qualities of the frequency domain framed audio data, along with quantitating those features into values (i.e., acoustic feature vectors or audio feature vectors). Feature extraction may determine automatic speech recognition feature/vector data, which may assist with speech recognition processing for ASR system 258, and user recognition feature extraction may determine user recognition feature/vector data, which may assist with speaker identification/user recognition for speaker identification system 270. The feature/vector data and the user recognition feature/vector data may include the same features/vectors, different features/vectors, or may include some overlapping features/vectors. A number of approaches may be used to extract features/vectors from the frequency domain framed audio data, such as MFCCs, PLP techniques, neural network feature vector techniques, linear discriminant analysis, semi-tied covariance matrices, and persons of ordinary skill in the art will recognize that any other suitable approach may be employed.

Speaker identification system 270 may perform speaker identification using various data including user recognition features/vector data, and training data that may correspond to sample audio data corresponding to known users associated with a particular device (e.g., electronic device 100). Speaker identification system 270 may generate confidence scores indicating a likelihood that a particular utterance was spoken by one of the users associated with a particular device, and may determine whether any of these confidence scores is greater than a predefined confidence score threshold. If so, then that may indicate a likelihood that a certain user is the speaker of the utterance. If two or more confidence scores are determined to be in excess of the confidence score threshold, then speaker identification system 270 may select the user having the greater confidence score, or may prompt the device to obtain additional information to resolve the speaker's identity.

In some embodiment, training data may be obtained and stored by user accounts system 268. The training data may be stored as waveforms and/or corresponding features/vectors, and may correspond to data from various audio samples, each audio sample associated with a known user and/or user identity. For example, each user known to the system may be associated with some set of training data for the known user. Speaker identification system 270 may then use the training data to compare against incoming audio data (represented by user recognition feature/vector data) to determine an identity of a user speaking an utterance. The training data may be associated with multiple users of multiple devices and therefore may be associated with both a user that spoke the respective utterance, as well as electronic device 100, which provided the audio data representing the spoken utterance.

The training data for a particular user may include a feature vector of the same size as a vector of the user recognition feature/vector data. Thus, for example, if a feature vector is of size F, the training data may also be a feature vector of size F. To create such a training data feature vector, during a training period computing system 200 may either prompt a user to speak sample audio data or may identify sample audio data known to have been spoken by a particular user. The system may then process the sample audio data to create sample training data (e.g., a feature vector of size F). The training data may then be stored by user accounts system 268 and saved for use during runtime user verification processing.

In some embodiments, speaker identification processing may further include various additional techniques to determine a speaker of an utterance. For example, device beaconing may indicate a likelihood that a particular individual's device is located proximate to electronic device 100. In this particular scenario, if an individual's device is determined to be substantially close to electronic device 100 at a time when the wakeword is uttered, then this may indicate that the wakeword was likely spoken by that individual. As another example, historical rules may be employed to determine a speaker of an utterance. For example, one particular individual may typically interact with electronic device 100, and therefore it may be more likely that when a wakeword is detected by electronic device 100, that wakeword is more likely than not spoken by that particular individual. Still further, certain individuals may be interact with electronic device 100 during certain times, or to perform certain functions. For example, a particular individual may typically ask for a weather forecast using electronic device 100 during a particular time frame (e.g., between 8 and 9 o'clock). In this particular scenario, if the wakeword is determined to have been uttered during that time frame, then this may indicate that there is a high likelihood that a speaker of the wakeword (and the corresponding utterance) is that individual. As another example, if a particular individual has just performed a specific function, such as sending a message to another individual, then if the wakeword is detected by electronic device 100 temporally after, and within a certain amount of time of, the specific function, then this may indicate that that individual likely spoke the corresponding utterance. Persons of ordinary skill in the art will recognize that various additional techniques may be employed to determine a speaker of an utterance, and the aforementioned are merely exemplary. Speaker identification system 270 may also include processor(s) 252, storage/memory 254, and communications circuitry 256.

Persons of ordinary skill in the art will recognize that although each of ASR system 258, NLU system 260, subject matter/skills system 262, TTS system 264, accounts system 268, and speaker identification system 270 may each include instances of processor(s) 252, storage/memory 254, and communications circuitry 256, and those instances of processor(s) 252, storage/memory 254, and communications circuitry 256 within each of ASR system 258, NLU system 260, functionalities system 262, TTS system 264, accounts system 268, and speaker identification system may differ. For example, the structure, functionality, and style of processor(s) 252 within ASR system 258 may be substantially similar to the structure, functionality, and style of processor(s) 252 within NLU system 260, however the actual processor(s) 252 need not be the same entity.

Computing system 200 may also include, in a non-limiting embodiment, communications system 220, which may be capable of facilitating a communications session between electronic device 100 and one or more additional devices, and/or providing communications to electronic device 100. For instance, communications system 220 may facilitate communications over a communications network. Communications system 220, in one embodiment, may include a communications routing system 226. Communications routing system 226 may employ VoIP functionality to facilitate audio, video, and/or text data communications between the initiating device and the recipient device. In some embodiments, communications routing system 226 may allow a communications session to be established between an initiating device and a recipient device using one or more VoIP protocols including, but not limited to SIP, RTP, RTCP, SRTP, and SDP. In one illustrative embodiment, a SIP signaling command may be provided to communications routing system 226 for communicating with the recipient device. In particular, PJSIP functionality adds a new "user-to-user" header that indicates the device pair for the communications session. As an illustrative example, communications routing system 226 may route communications to a device's communications identifier in response to receiving an instruction to establish a communications session between one communications identifier and another.

In one embodiment, communications routing system 226 may include any suitable rules and/or prioritization schemes for organizing and group messages received for one or more user accounts and/or group accounts. For example, rules that cause messages having similar sender information to be grouped together may be included within communications routing system 226. In some embodiments, communications routing system 226 may include one or more rules to prioritize messages for playback. Such rules may include, but are not limited to, playback rules based on speaker identification, sender information, urgency of a message, vocal inflection, temporal aspects of the message, and/or content of the message. Communications routing system 226 may also include a message database, in one embodiment, capable of storing messages, or any other type of communication (e.g., telephone calls, text messages, emails, etc.). The message database may store each message that has been received with a corresponding user account or group account with which that message is directed to. Communications routing system 226 may also include processor(s) 252, storage/memory 254, and communications circuitry 256.

In one embodiment, communications system 220 may include communications accounts system 222, which may store one or more group accounts corresponding to one or more shared devices. Communications account system 222 may include a communications account database that stores communications identifiers for each group account and/or user account that is capable of communicating using communications system 220. In one embodiment, each communications account may be stored as being associated with account identifiers, linking accounts for speech-processing system 250 and communications system 220. For example, a shared device, such as shared voice activated electronic device 100, may have its own group account stored on communications accounts system 222. The group account may be associated with the shared device, and may also be linked to one or more individual's user accounts. For example, shared electronic device 100 may be associated with a first group account corresponding to a first grouping of individual (e.g., a family). One or more user accounts may also be associated with the first group account (e.g., individual members of the family), corresponding to individuals that may be capable of interacting with shared electronic device 100. Information, settings, and/or preferences, for example, for each user account may be stored within a user account database. In some embodiments, communications accounts system 222 and accounts system 268 may communicate with one another via network 230 to provide one another with account information associated with certain devices and communications accounts. For example, accounts system 268 may store voice biometric data for a particular user account, which may then be provided to communications accounts system 222 to determine a communications identifier and/or other communications information associated with that user account so as to allow a device associated with the user account to communicate with one or more additional devices. Communications account system 222 may also include processor(s) 252, storage/memory 254, and communications circuitry 256.

Communications system 220 may, in some embodiments, include a contact services system 228. Contact services system 228 may store contact lists, contact information, and the like, associated with one or more communications identifiers. For example, if electronic device 100 is registered to an account identifier associated with individual 2, then a contact list associated with individual 2 may be accessible from contact services system 228 based on a communications identifier associated with the account identifier. In some embodiments, two or more communications identifiers may be linked together such that their contact lists may both be used to populate another contact list, such as a group account's contact list. For example, if two user accounts, corresponding to two separate users, are both associated with a same group account, then contact lists for each of the two user accounts may form the group account's contact list, which may then be associated with the account identifier. Contact services system 228 may also include processor(s) 252, storage/memory 254, and communications circuitry 256.

Communications system 220 may also, in one embodiment, include a preferences system. Preferences system 224 may, in one embodiment, store information associated indicating which group accounts have granted a requesting group account with permission to establish a communications session with that group account. For example, upon a new contact being added to contact management system 228, a prompt may be provided to an individual to determine whether communication session privileges are allowed for that contact such that the contact may be able to establish a communications session with the individual (or other individuals associated with the shared electronic device) without requiring the individual to "accept" or "approve" the communications session. In some embodiments, the permission may be automated such that individuals that have granted permission to certain group accounts will be automatically stored by preferences system 224. When a user requests for contacts to be displayed, preferences system 224 may be accessed to obtain a list of group accounts that have authorized a particular group account associated with the request. Preferences system 224 may then provide a supplemental list, or list metadata, that indicates which group accounts stored within the contacts list of the communications account system 222 for the requesting device have granted the permission to the requesting group account. Preferences system 224 may also include processor(s) 252, storage/memory 254, and communications circuitry 256.

In some embodiments, communications system 220 may further include a contact presence aggregator system 244. Contact presence aggregator system 244 may, in one embodiment, aggregate presence status values obtained from contact presence monitoring system 242, and may generate list metadata indicating which group accounts are currently "present" and which group accounts are currently "not present." Each of the group accounts from the list of group accounts that have provided authorization to a requesting device's group account may be compiled by contact presence aggregator 244 into two groups: active and non-active. For example, if a group account associated with electronic device has two group accounts associated with contacts that have authorized communications session establishment therewith, contact presence aggregator may access contact presence monitoring system 242 to determine the presence status for the communications identifiers associated with those group accounts. If any of those group accounts are currently indicated as being "present," then contact presence aggregator 244 may generate list metadata that indicates their presence. This list metadata may be provided to a requesting device along with list data representing a contact list to indicate which contacts of an individual's contact list are available for initiating a communications session with. Contact presence aggregator 244 may also include processor(s) 252, storage/memory 254, and communications circuitry 256.

Persons of ordinary skill in the art will recognize that although each of communications account system 222, preferences system 224, communications routing system 226, contact services system 228, and contact presence aggregator system 244 may each include instances of processor(s) 252, storage/memory 254, and communications circuitry 256, and those instances of processor(s) 252, storage/memory 254, and communications circuitry 256 within each of communications account system 222, preferences system 224, communications routing system 226, contact services system 228, and contact presence aggregator system 244 may differ.

Computing system 200 may also include, in a non-limiting embodiment, presence tracking system 240. Presence tracking system 240 may include a contact presence monitoring system 242. Contact presence monitoring system 242 may track a presence status of various devices capable of communicating using communications system 220 and/or interacting with speech-processing system 250. In some embodiments, contact presence monitoring system 242 may periodically send presence status requests to electronic devices, such as electronic device 100, which are associated with computing system 200 to determine whether or not those devices are currently detecting human presence. For example, every few minutes (e.g., 1-5 minutes), contact presence monitoring system 242 may send a presence status request to electronic device 100. Electronic device 100 may determine, in response to receiving the request, whether electronic device 100 has recently detected an activity event, and may send a notification (e.g., a logical 1/0) to contact presence monitoring system 242 to indicate the presence status.

Presence status may be determined locally, in one embodiment, by electronic device 100. For example, in response to detecting an activity event, such as an interaction with electronic device 100 (e.g., utterance of a wakeword, manual input being detected, and the like), a computer vision system detecting at least a portion of a human body part, and/or device beaconing detecting a signal from an individual's mobile device (e.g., smartphone, tablet, etc.), electronic device 100 may register a presence event as having occurred. The time that the presence event is detected may also be determined. Human presence may be said to exist proximate to electronic device so long as a presence confidence score exceeds a presence confidence threshold. For example, at the time that the presence event occurs, the presence confidence score may be 1.0, or 100%. As time progresses, the presence confidence score may slowly decrease—so long as no additional presence events occur—until reaching 0.0, or 0%. For example, the amount of time between a presence event occurring and the presence confidence score falling to 0.0 may be set by a user (e.g., 1-5 minutes). The presence confidence threshold may also be set by the user, in one embodiment. For example, the presence confidence threshold may be set at 0.5, or 50%. If the presence confidence score is greater than the presence confidence threshold, then this may indicate that the amount of time between the presence event occurring and the presence status request being received is small enough such that there is a high likelihood of the individual associated with the presence event still being located proximate to electronic device 100. In some embodiments, as a presence confidence score changes from exceeding the presence confidence threshold to being equal to or less than the presence confidence threshold, electronic device 100 may send updated presence status information to contact presence monitoring system 242. Similarly, if the presence confidence score for electronic device 100 changes from being less than the presence confidence threshold to being greater than the presence confidence threshold, then the updated presence status information may be provided to contact presence monitoring system 242. Contact presence monitoring system 242 may also include processor(s) 252, storage/memory 254, and communications circuitry 256.

Figure 3:
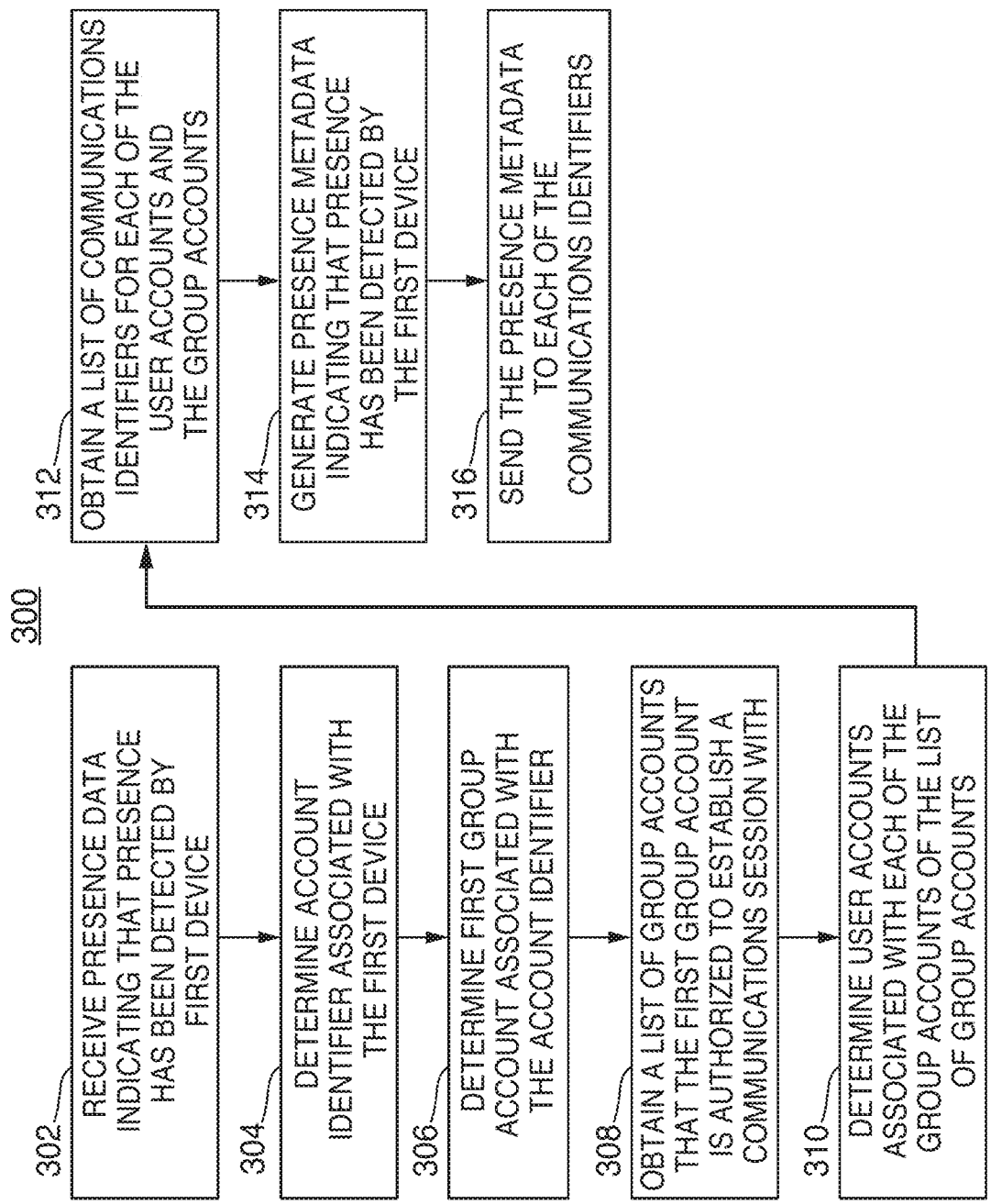
FIG. 3 is an illustrative flowchart of an exemplary process for providing authorized contacts with updated presence information in response to presence being detected, in accordance with various embodiments.

FIG. 3 is an illustrative flowchart of an exemplary process for providing authorized contacts with updated presence information in response to presence being detected, in accordance with various embodiments. Process 300, in a non-limiting embodiment, may begin at step 302. At step 302, presence data indicating that a presence event has been detected by a first device may be received. In response to detecting the presence event, such as, and without limitation, a wakeword or other utterance being spoken, an input being detected, computer vision recognizing the presence of at least a portion of a human body part, and/or device beaconing, electronic device 100, for example, may generate presence data indicating that presence has been detected, and may send the presence data to computing system 200. In particular, the presence data, in one embodiment, may be sent from electronic device 100 to presence tracking system 240 of computing system 200. The presence data may, for example, correspond to a logical 1/0, or True/False, that indicates to presence tracking system 240 that electronic device 100 has, or has not, detected human presence proximate thereto. In some embodiments, the presence data may only be sent to presence tracking system 240 in response to detecting the presence event, however persons of ordinary skill in the art will recognize that this is merely exemplary. For instance, presence data may be sent periodically to indicate a current presence status of electronic device 100.

At step 304, an account identifier associated with the first device may be determined. The account identifier, in one embodiment, may be received with the presence data. For example, the account identifier may be included within metadata appended, or sent with, the presence data. In some embodiments, however, the account identifier may be determined based on a device identifier associated with the first device that is alternatively sent along with the presence data. The account identifier, as mentioned previously, may indicate a user account associated with the first device. For example, the account identifier may indicate a registered account on speech-processing system 250, and in particular accounts system 268, with which electronic device 100 is associated with. In some embodiments, the account identifier may be received by communications system 220, which may store various account identifiers and corresponding information associated with those account identifiers (e.g., MAC addresses, serial numbers, IP addresses, etc.). For instance, communications system 220 may store routing tables indicating account identifiers, and the device identifiers and communications identifiers that may be associated with those account identifiers.

At step 306, a first group account associated with the account identifier may be determined. For instance, the account identifier that was received may indicate a registered user account on computing system 200 that electronic device 100 is associated with. The registered user account may correspond to a primary user's account that electronic device 100 is designated as being registered to during an initial device setup for electronic device 100. Using the account identifier, communications system 220 may access communications account system 222 to determine whether or not that account identifier is a participant (e.g., has a communications account) for communications system 220, and/or whether that account identifier is associated with a group account of communications system 220. For example, an individual associated with an account identifier may elect to join a communications network facilitated by communications system 220. After joining the communications network, the individual may create a group account that is associated with a communications identifier that is linked to the account identifier. The communications identifier may allow an individual's group account to participate in communications sessions with other group accounts and, more generally, communicate with other devices across a communications network supported by communications system 220. Persons of ordinary skill in the art will recognize that an individual may be capable of communicating with other devices not associated with a communications network facilitated by communications system 220 using their electronic device, and the aforementioned is merely exemplary.

At step 308, a list of group accounts that the first group account is authorized to establish a communications session with may be obtained. In some embodiments, communications account system 222 and/or contact management system 228 may determine, based on the account identifier associated with electronic device 100, contact data representing a contact list for the account identifier. For each contact in the contact list, a determination may be made as to whether or not that contact has their own group account, and whether that contact's group account has provided authorization for the group account associated with the account identifier to establish communications sessions therewith. For example, a first group account may be associated with electronic device 100. The first group account may have a contact stored within their contact list by contact management system 228, where that contact is associated with a second group account. The second group account may have provided authorization to the first group account, which is stored by communications account system 222, such that the first group account may initiate a communications session with the second group account without requiring a device associated with the second group account explicitly accept/approve.

At step 310, user accounts associated with each of the group accounts of the list of group accounts may be determined. Each group account may be associated with one or more user accounts. For example, a group account may be associated with two or more user accounts, each having their own contact information. In some embodiments, however, some group accounts of the list of group accounts may not be associated with any group accounts. At step 312, a list of communications identifiers for each of the user accounts, as well as each of the group accounts of the list of group accounts, may be obtained. For example, a communications identifier for each of the two contacts associated with the group account, as describe previously, may be obtained. In some embodiments, two or more user accounts may both be associated with a same group account, and therefore a communications identifier for the group account and for either of the two user accounts may be included within the list of communications identifiers.

At step 314, presence metadata indicating that presence has been detected by the first device may be generated. For example, the presence metadata may indicate that a device associated with a particular communications identifier has detected a presence event, indicating that there is a high likelihood that human presence has been proximate to a device associated with that communications identifier. The presence metadata may include information indicating the group account, as well as that group account's current presence status. At step 316, the presence metadata may be sent to each communications identifier of the list of communications identifiers obtained at step 312. This may allow each group account (and each user account associated with those group accounts) that has granted authorization to the first group account to establish a communications session with that group account, to be notified that someone is likely present proximate to a device associated with the first group account such that a communications session between one group account and the first group account may be initiated. This may allow an individual, upon requesting that active contact be displayed by their electronic device, to be visually notified that human presence has been detected by a device associated with the first group account, and therefore if a communications session is initiated with the first group account, someone will likely be available to participate in the communications session.

As an illustrative example, a first device may be continually monitored to determine whether or not human presence has been detected proximate thereto. The first device may be associated with a particular group account on computing system 200, where the group account may be a contact of another group account's contact list. During a first amount of time, a presence likelihood score may be generated by computing system 200 based upon received presence data. For instance, during the first amount of time, the presence likelihood score may be less than or equal to a presence confidence score threshold, which may indicate that there is a lack of human presence that has been detected by the first device. During a second amount of time after a temporal end of the first amount of time, another presence likelihood score may be determined based on an updated presence status of the first device. The presence likelihood score, during the second amount of time, may now be greater than the presence confidence score threshold, which may indicate that human presence has been detected by the first device. Therefore, presence metadata may be generated to indicate that the group account is now "present," and the presence metadata may be sent to each communications identifier associated with the group account's list of group accounts.

Figure 4:
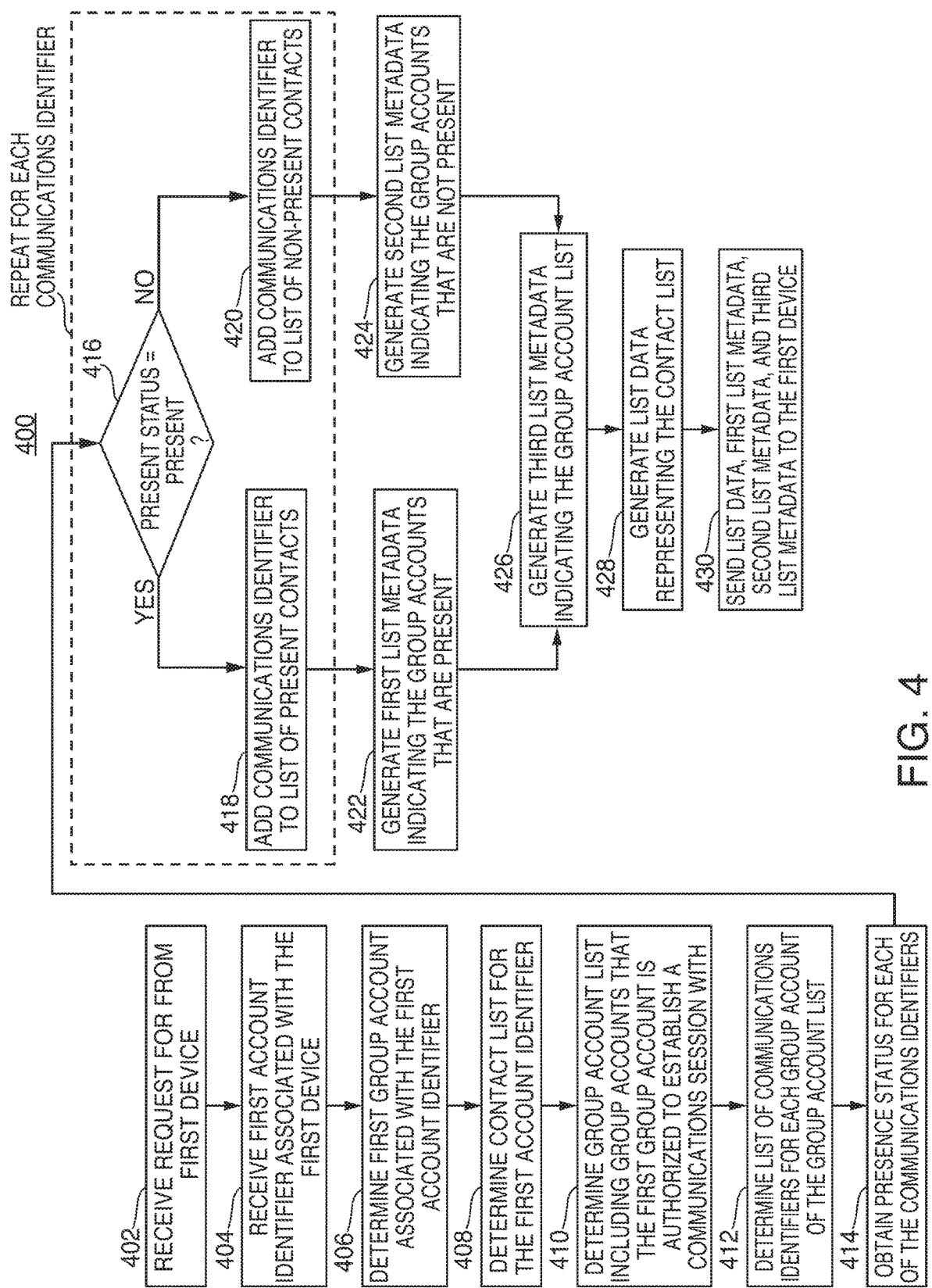
FIG. 4 is an illustrative flowchart of an exemplary process for providing a contact list that indicates contacts that are present, as well as contacts that are available for participation in a communications session, in accordance with various embodiments.

FIG. 4 is an illustrative flowchart of an exemplary process for providing a contact list that indicates contacts that are present, as well as contacts that are available for participation in a communications session, in accordance with various embodiments. Process 400, in a non-limiting embodiment, may begin at step 402. At step 402, a request may be received from a first device. The request may, for instance, be received by computing system 200 from electronic device 100. In some embodiments, the request may correspond to a portion of an utterance. For example, an individual may say, "Alexa, show my contacts." In response to detecting the wakeword (e.g., "Alexa") for that individual's device (e.g., electronic device 100), audio data representing the utterance may be sent to a speech processing system (e.g., speech-processing system 250), which may generate text data representing the audio data, and may then determine that the intent of the utterance was for contact data associated with an indication that one or more users are located physically proximate to their respective devices be displayed by the electronic device 100. In some embodiments, the utterance may not include a wakeword, but may instead audio data representing an utterance requesting that the contact data be displayed may be sent to a speech-processing system in response to a manual input, or other trigger expression or sound being detected. Still further, in some embodiments, a manual request to display the contact data may be detected by the device, such as via a touch input detected by a display screen, which may in turn be sent to computing system 200.

At step 404, a first account identifier associated with the first device may be received. The first account identifier, in some embodiments, may be received along with the request. For example, the account identifier may be sent as metadata with the request from electronic device 100 to computing system 200. The first account identifier may indicate a registered user account on computing system 200 that the first device is associated with. For example, when electronic device 100 is first set up, it may be linked to a particular user account on computing system 200 (e.g., accounts system 268).

At step 406, a first group account associated with the first account identifier may be determined. For example, communications account system 222 may be accessed to determine a group account for communications system 220 that is associated with the account identifier. In particular, a communications identifier associated with the first group account may be determined based on the first account identifier. At step 408, a contact list for the first account identifier may be determined. In some embodiments, in response to the first account identifier and the request being received, contact services system 228 may be accessed to obtain contact list data representing a contact list for the first account identifier. The contact list may include a list of contact names—as well as, for instance, additional contact information (e.g., phone numbers, profile pictures, etc.)—that are stored as being associated with the first group account.

At step 410, a group account list may be determined, where the group account list includes group accounts that have authorized the first group account with permission to initiate and establish communications sessions with those group accounts. In some embodiments, for each contact of the contact list, an indicator may be stored that indicates whether or not that contact has a group account associated with it and, if so, whether or not that group account has granted authorization to the first group account such that the first group account may establish a communications sessions with that group account. For example, the contact list associated with the first communications identifier may include a first contact and a second contact, and contact information (e.g., name, address, etc.) may be stored by contact management system 228. For each of the first and second contacts, communications account system 222 may store group account information, such as a communications identifiers, that indicates group accounts that are associated with those contacts. For example, the first contact may be associated with a first communications identifier corresponding to a first contact group account and the second contact may be associated with a second communications identifier corresponding to a second contact group account. Furthermore, communications account system 222 may store communications session authorization information that indicates whether a particular group account has granted another group account authorization to establish a communications therefore. For example, communications account system 222 may store a first notification (e.g., a data flag) for the first contact group account that indicates that the first contact group account has granted the first group account with the authorization (e.g., data flag set to TRUE or a logical 1), while a second notification may be stored for the second contact group account that indicates that the second contact group account has not granted the first group account with the authorization (e.g., data flag set to FALSE or logical 0).

At step 412, a list of communications identifier for each group account of the group account list may be determined. This may provide a mechanism for communications system 220 to contact a particular group account, such as a group account that has granted authorization to establish a communications session therewith, to determine a presence status of that group account. At step 414, a presence status for each of the communications identifiers of the list of communications identifiers may be obtained. The presence statuses may indicate which group accounts of the group account list are currently listed as being "present," indicating that human presence has likely been detected by a device associated with those group accounts within a predefined amount of time of when the request was received by computing system 200. The presence status may, alternatively, indicate which group accounts of the group account list are currently not present, indicating that human presence has likely not been detected within a certain amount of time of when the request was received. In some embodiments, presence tracking system 240, and in particular contact presence monitoring system 242, may obtain a presence status associated with each of the device identifiers to determine whether that device has detected human presence, or has not detected human presence. For example, presence may be said to have been detected a presence confidence score for that device is greater than a presence confidence score threshold. As an illustrative example, a device that has detected a presence event (e.g., utterance of a wakeword) may, at that instance, register a presence confidence score of 1.0. If the presence confidence threshold is 0.5, then presence may be said to have been detected by that device. The further away, temporally, from the presence event, the less the presence confidence score may be. For example, the presence confidence score may decrease from 1.0 to 0.0 over a predefined amount of time so long as no additional presence events are detected. In some embodiments, the presence confidence score may decay exponentially from the instant that the presence evens detected such that, as the amount of time between the presence event increases, the presence confidence score decays to being 0.0.

At step 416, a determination of whether the presence status for each of the communications identifiers indicates that presence has been detected. Therefore, the determination of step 416 may, in some embodiments, correspond to presence monitoring system 242 determining that the presence confidence score associated with a particular communications identifier is still greater than the presence confidence threshold. If, at step 416, a particular communications identifier, and thus group account associated therewith, is determined to be present, then process 400 may proceed to step 418 where the communications identifier may be added to a list of present contacts. However, if at step 416 it is determined that a particular communication identifier's device has not detected presence, then process 400 may proceed to step 420. At step 420, the account identifier may be added to a list of non-present contacts. Persons of ordinary skill in the art will recognize that steps 416-420 may be repeated for each communications identifier of the list of communications identifiers, such that an aggregation of the present group accounts may be performed by contact presence aggregator 244. For instance, contact presence aggregator 244 may compile each communications identifier for a contact list that is indicated as being present, and add these communications identifiers to the list of present contacts. At step 422, first list metadata indicating the group accounts that are currently present may be generated. Similarly, at step 424, second list metadata indicating the group accounts that are currently non-present may be generated.

At step 426, third list metadata indicating the group account list may be generated. For example, the third list metadata may indicate which of the requesting device's contacts have group accounts on communications system 220, as well as which of those contacts have granted the first group account with permission to initiate and establish a communications session. At step 428, list data representing the contact list for the first account identifier may be generated. For example, the list data may include each contact's name, profile picture, and the like. At step 430, the list data, the first list metadata, the second list metadata, and the third list metadata may be sent to the first device. The first device, upon receipt of the list data, first list metadata, second list metadata, and third list metadata, may then be capable of rendering a GUI indicating the requesting device's contacts, which of those contacts have group accounts on communications system 220, which of those contacts have authorized that device with the ability to initiate a communications session with that contact's group account, and which of those contacts that have provided authorization are currently present proximate to their device. This may allow an individual, upon requesting that their current contacts be displayed, the ability to quickly and easily see which contacts are near their corresponding device such that a communications session between the individual and the contact may commence.

Figure 5:
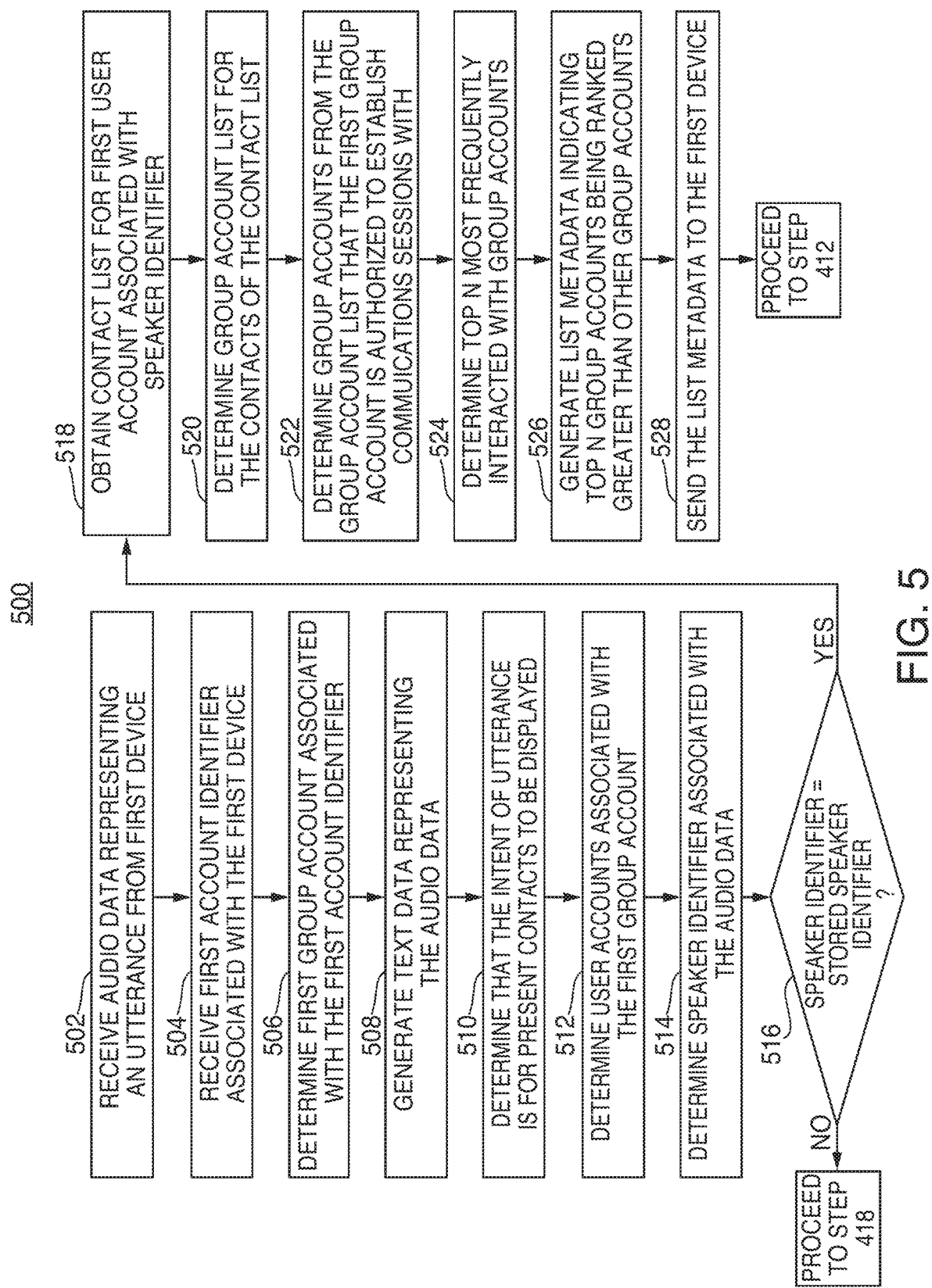
FIG. 5 is an illustrative flowchart of an exemplary process for ranking contacts for being displayed on an electronic device for a particular user account using speaker identification processing, in accordance with various embodiments.

FIG. 5 is an illustrative flowchart of an exemplary process for ranking contacts for being displayed on an electronic device for a particular user account using speaker identification processing, in accordance with various embodiments. Process 500, in a non-limiting embodiment, may begin at step 502. At step 502, audio data representing an utterance may be received from a first device. For example, audio data representing an utterance (e.g., "Show me my contacts") may be received by computing system 200, and in particular speech-processing system 250, from shared voice activated electronic device 100.

At step 504, an account identifier associated with the first device may be received. The account identifier may correspond to a particular registered account of accounts system 268 with which electronic device 100 is registered to. At step 506, a first group associated with the first account identifier may be determined. For instance, upon determining the first account identifier, speech-processing system 250, and in particular a communications functionality of functionality system 262, may access communications account system 222 of communications system 220 to determine a group account associated with the first account identifier.

At step 508, text data representing the audio data may be generated. For instance, upon receipt of the audio data, speech-processing system 250 may provide the audio data to ASR system 258, which, using STT system 266, may generate text data representing the audio data. At step 510, it may be determined, using the generated text data, that the intent of the utterance is for contact data associated with an indication that a user, or users, are located physically proximate to their respective devices, where each user corresponds to a contact from a contact list associated with the first group account. For example, NLU system 260 may receive the text data, and may determine that the utterance is likely associated with a communications/presence domain and/or functionality, having an intent being for determining contacts associated with the requesting device's account, and which of those devices currently have a human presently located nearby them such that a communications session with that device may be initiated.

At step 512, one or more user accounts that are associated with the first group account may be determined. For instance, as mentioned previously, a group account may be associated with multiple user accounts, where users of each user account may be capable accessing communications received by/sent from the group account. In some embodiments, communications account system 222 may store information indicating which user accounts are associated with which group accounts.

At step 514, a speaker identifier associated with the audio data may be determined. The speaker identifier, in one embodiment, may correspond to a voice print, voice signal, and/or acoustic feature vector representing acoustic features of the audio data. In some embodiments, speaker identification system 270 may perform speaker identification processing to determine a speaker identifier associated with the received audio data in an attempt to determine "who" spoke the utterance. For example, acoustic features representing the audio data may be generated, and vector data representing the acoustic features may be generated. At step 516, a determination may be made as to whether the speaker identifier determined at step 514 is substantially equivalent to a stored speaker identifier associated with one of the user accounts of the first group account. For example, a speaker identification confidence score may be generated indicating how similar the vector data representing the acoustic features of the audio data is to stored vector data representing stored acoustic features for a particular user account. If the speaker identification confidence score is greater than a predefined speaker identification confidence score threshold, then this may indicate that the utterance was spoken by a user associated with that user account. If, at step 516, it is determined that the speaker identifier is not equivalent to any of the user accounts associated with the first group account (e.g., speaker identification confidence score is less than or equal to the predefined speaker identification confidence threshold), then process 500 may proceed to step 418 of process 400. However, if the speaker identifier is determined to be equal to a stored speaker identifier for one of the user accounts associated with the first group account (e.g., the speaker identification score is greater than the predefined speaker identification confidence threshold), then process 500 may proceed to step 518.

At step 518, a contact list for the first user account associated with the first group account may be obtained. For instance, contact list data representing the contact list may be obtained from contact services system 228. In some embodiments, the first user account's contact list may be obtained based on the speaker identification processing determining that a user associated with the first user account was the likely speaker of the utterance. A contact list associated with the first user account, as stored by contact services system 228, may be determined. The contact list may include contact information associated with each contact that the first user account has stored within contact services system 228. In some embodiments, the contact list may also include contact information for contacts associated with other user accounts also associated with the first user account. At step 520, a group account list for the contacts of the contact list may be determined. The group account list may be determined using communications account system 222, which may store indications of which contacts from the contact list have a group account on communications system 220. At step 522, group accounts that have authorized the first group account, such that the first group account may be capable of initiating and/or establishing a communications session with that group account, may be determined. In some embodiments, steps 518-522 of FIG. 5 may be substantially similar to steps 408-410 of FIG. 4, and the previous descriptions may apply.

At step 524, a top N most frequently interacted with group accounts may be determined. For example, a group account that the first group account has communicated with (e.g., called, messaged, etc.) most, as compared to any of the other group accounts of the group accounts that have granted the authorization to the first group account, may be considered a most frequently interacted with group account. Each time a group account is communicated with, communications routing system 226 and/or preferences system 224 may store an indicator that increments a counter for that group account and the first group account. In this way, a group account more frequently communicated with may be recognized by communications system 220 as compared to a group account that is infrequently communicated with. The number N of frequent contacts may be any suitable number, and may be set by preferences system 224 or may be set by an individual associated with the first group account. As an illustrative example, the number N of frequent contacts may be three, four, five, etc. In some embodiments, the number of frequent contacts may be dynamic, and may depend on a particular device that the request (e.g., utterance 4) was received from. Generally speaking, each group account may be stored in a hierarchal manner such that the most frequent group accounts (as well as contacts) are included in the frequent contact list at the top, while less frequent group accounts are included toward the bottom. Persons of ordinary skill in the art will further recognize that although the top N most frequently interacted with group accounts are determined at step 524, in some embodiments, the top N most frequently interacted with contacts may be determined at step 524, and the aforementioned is merely exemplary.

At step 526, list metadata indicating the top N group accounts being ranked greater than other group accounts may be generated. For instance, the list metadata may rank each communications identifier for each group account such that the most frequently communicated with group account is ranked first, and the least frequently communicated with group account is ranked last. At step 528, the list metadata may be sent to the first device. After step 528, process 500 may proceed to step 412 of FIG. 4 where a presence status for each group account is determined, and group accounts that are present may be identified, and group accounts that are not present may be identified.

Figure 6:
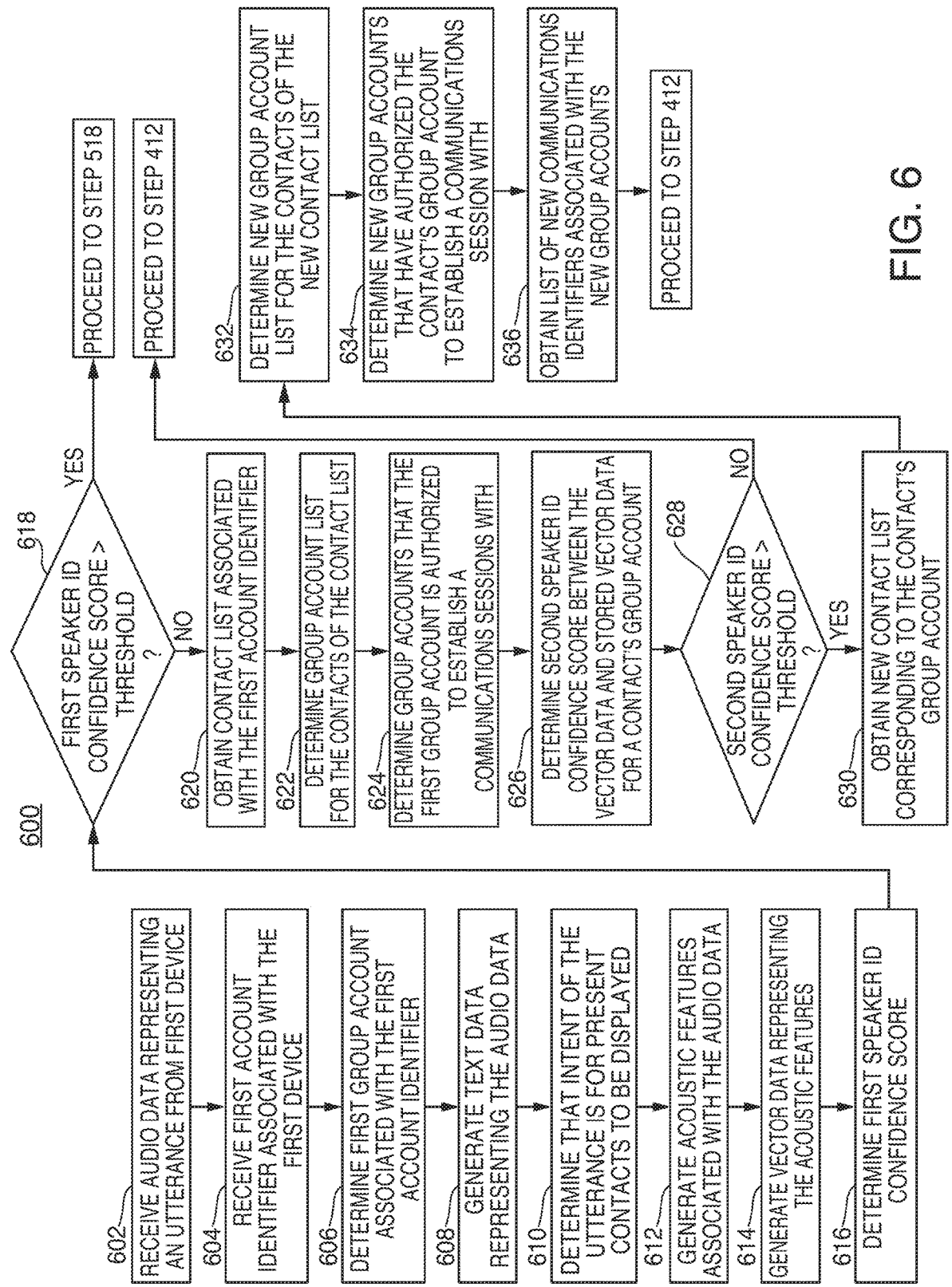
FIG. 6 is an illustrative flowchart of an exemplary process for providing a contact list indicating contacts that are present where the contact list is obtained based on speaker identification processing, in accordance with various embodiments.

FIG. 6 is an illustrative flowchart of an exemplary process for providing a contact list indicating contacts that are present where the contact list is obtained based on speaker identification processing, in accordance with various embodiments. Process 600, in a non-limiting embodiment, may begin at step 602. At step 602, audio data representing an utterance may be received from a first device. At step 604, an account identifier associated with the first device may be received. At step 606, a first group account associated with the first account identifier may be determined. At step 608, text data representing the audio data may be generated. At step 610, it may be determined that an intent of the utterance is for present contacts to be displayed by the first device. In some embodiments, steps 602-610 of FIG. 6 may be substantially similar to steps 502-510 of FIG. 5, and the previous descriptions may apply.

At step 612, acoustic features associated with the first audio data may be generated. For instance, the audio data representing the utterance, or a copy of the audio data, may be provided to speaker identification system 270. Speaker identification system 270 may divide the audio data into audio frames representing time intervals, with which a number of values or features representing qualities of the audio data may be determined, along with a set of those values (e.g., feature vectors or audio feature vectors) representing features/qualities of the audio data for each audio frame. This may result in a sliding window where adjacent audio frames include a certain amount of overlapping audio. At step 614, acoustic vector data, which may also be referred to as vector data, representing the acoustic features may be generated. Feature extraction may determine automatic speech recognition feature/vector data, which may assist with speech recognition processing for ASR system 258, and user recognition feature extraction may determine user recognition feature/vector data, which may assist with speaker identification/user recognition for speaker identification system 270. The feature/vector data and the user recognition feature/vector data may include the same features/vectors, different features/vectors, or may include some overlapping features/vectors. A number of approaches may be used to extract features/vectors from the frequency domain framed audio data, such as MFCCs, PLP techniques, neural network feature vector techniques, linear discriminant analysis, semi-tied covariance matrices, and persons of ordinary skill in the art will recognize that any other suitable approach may be employed. The training data for a particular user may include a feature vector of the same size as a vector of the user recognition feature/vector data. Thus, for example, if a feature vector is of size F, the training data may also be a feature vector of size F. To create such a training data feature vector, during a training period computing system 200 may either prompt a user to speak sample audio data or may identify sample audio data known to have been spoken by a particular user. The system may then process the sample audio data to create sample training data (e.g., a feature vector of size F). The training data may then be stored by accounts system 268 and saved for use during runtime user verification processing.

At step 616, a first speaker identification confidence score indicating a likelihood that the vector data matches stored vector data associated with stored acoustic features corresponding to one or more user accounts associated with the first group account may be determined. For example, first stored vector data for a first user account, corresponding to a first user, associated with the first group account may be obtained and compared with the generated vector data. At step 618, a determination may be made as to whether or not the first speaker identification confidence score is greater than a predefined speaker identification confidence threshold. If so, then process 600 may proceed to step 518 of process 500. However, if the first speaker identification confidence score is determined to be less than or equal to the predefined speaker identification confidence threshold, then process 600 may proceed to step 620.

At step 620, a contact list associated with the first account identifier may be obtained. At step 622, a group account list for the contacts of the contact list may be determined. At step 624, group accounts that have authorized the first group account for establishing a communications session with that group account may be determined. In some embodiments, steps 620-624 of FIG. 6 may be substantially similar to steps 518-522 of FIG. 5, and the previous descriptions may apply.

At step 626, a second speaker identification confidence score may be determined indicating a likelihood that the generated vector data and stored vector data for a contact's group account are equivalent. For example, a group account that has authorized the first group account may be associated with a first user account. That first user account may have stored vector data representing acoustic features associated with a user of the first user account. This stored vector may be compared with the generated vector data to determine whether the speaker of the utterance corresponds to a contact of the first group account. At step 628, a determination may be made as to whether the second speaker identification confidence score is greater than the predefined speaker identification confidence threshold. In some embodiments, the speaker identification confidence threshold of step 628 may differ from the speaker identification confidence threshold of step 618, however this is merely exemplary. If, at step 628, it is determined that the second speaker identification confidence score is less than or equal to the predefined speaker identification threshold, then process 600 may proceed to step 412 of process 400, such that communications identifiers for each of the group accounts that have granted authorization for establishing communications with the first group account may be obtained. However, if at step 628 it is determined that the second speaker identification score is greater than the predefined speaker identification confidence threshold, then process 600 may proceed to step 630.

At step 630, a new contact list corresponding to the contact's group account associated with the stored vector data that was determined to match the generated vector may be obtained. For instance, if a first user account associated with a contact group account corresponding to a first contact of the first group account is determined to be associated with the stored vector data, then the contact list associated the contact group account may be obtained. At step 632, a new group account list for the contacts of the new contact list may be determined. At step 634, new group accounts that have authorized the contact's group account to establish a communications session with may be determined. In some embodiments, steps 630-634 may be substantially similar to steps 620-624, with the exception that the former correspond to contacts associated with the identified speaker's group account. At step 636, a list of new communications identifiers associated with the new group accounts may be obtained. At this point, process 600 may proceed to step 412 of process 400, where active group accounts that have authorized the contact's group account to establish communications sessions therewith may be determined, and list data, and list metadata associated with the active and inactive group accounts, may be generated and sent to the first device.

In this way, if an individual is at a friend's home and says to the friend's communal device, "Alexa, show my contacts," computing system 200 may be capable of determining that the friend is not a member of that device's group account, but is a member of a group account that is a contact of the device's group account. This may allow the individual with the ability to see which of the individual's contacts are available for communications sessions using their friend's communal device by computing system 200 being capable of identifying the individual using that individual's voice.

The various embodiments of the invention may be implemented by software, but may also be implemented in hardware, or in a combination of hardware and software. The invention may also be embodied as computer readable code on a computer readable medium. The computer readable medium may be any data storage device that may thereafter be read by a computer system.

The above-described embodiments of the invention are presented for purposes of illustration and are not intended to be limiting. Although the subject matter has been described in language specific to structural feature, it is also understood that the subject matter defined in the appended claims is not necessarily limited to the specific features described. Rather, the specific features are disclosed as illustrative forms of implementing the claims.

What is claimed is:

1. A method, comprising:
receiving, from a first electronic device and by a computing system, a first request to display contact data associated with a first user who is located physically proximate to a second electronic device associated with the first user;
receiving a first account identifier corresponding to a first user account registered to the computing system for the first electronic device;
querying an accounts database for a group account that is associated with the first account identifier;
determining that the first account identifier is associated with a first group account, the first group account being associated with at least the first user account, a second user account, and a third user account, such that communications received and sent by the first group account are accessible by the first user account, the second user account, and the third user account;
determining a first contact list associated with the first group account, the first contact list comprising a second account identifier corresponding to a second group account;
generating first list data representing the first contact list;
determining that the second group account has granted authorization to the first group account such that the first group account is able to establish a voice communications session with a device associated with the second group account without requiring the device associated with the second group account to explicitly approve the voice communications session;
generating first presence metadata indicating that human presence has been detected by the device associated with the second group account within a predefined amount of time of when the first request was received;
sending the first list data to the first electronic device;
sending the first presence metadata to the first electronic device;
receiving, from the first electronic device, input data;
determining, using the input data, a second request to initiate a voice communications session with a second user associated with the second group account; and
establishing, in response to the second request and based at least in part on determining that the second group account has granted the authorization, a voice communications session between the first electronic device and the device associated with the second group account.

2. The method of claim 1, further comprising:
generating acoustic features associated with audio data representing an utterance including the first request;
generating vector data representing the acoustic features;
determining a first speaker identification confidence score indicating how similar the vector data is to a stored vector data representing stored acoustic features associated with the first user account;
determining that the first speaker identification confidence score is greater than a predefined speaker identification confidence score threshold indicating that the utterance was spoken by a third user associated with the first user account;
determining a frequent contact list comprising contacts from the first contact list ranked from most frequently communicated with by the first user account to least frequently communicated with by the first user account;
generating list-ranking metadata indicating the frequent contact list; and
sending the list-ranking metadata to the first electronic device.

3. The method of claim 1, further comprising:
determining that the first contact list further comprises a third account identifier associated with a third group account;
determining, during a first period of time, a first presence likelihood score associated with the third group account;
determining that the first presence likelihood score is less than or equal to a presence confidence score threshold indicating a lack of human presence being detected by an additional device associated with the third group account;
determining, during a second period of time, a second presence likelihood score associated with the third group account;
determining that the second presence likelihood score is greater than the presence confidence score threshold;

generating second presence metadata indicating that human presence has been detected by the additional device within the predefined amount of time; and sending the second presence metadata to the first electronic device.

4. The method of claim 1, further comprising:

receiving, from the first electronic device and by the computing system, audio data representing an utterance including a third request to display the contact data;

generating second text data re presenting the audio data;

determining, using the second text data, that an intent of the utterance is to display the contact data;

generating acoustic features associated with the audio data;

generating vector data representing the acoustic features;

determining a first speaker identification confidence score indicating how similar the vector data is to stored vector data representing stored acoustic features associated with a third user account, the third user account being associated with a third group account, wherein the first contact list further comprises a third account identifier associated with the third group account;

determining that the first speaker identification confidence score is greater than a predefined speaker identification confidence score threshold indicating that the utterance was spoken by a third user associated with the third user account;

determining a second contact list associated with the third group account, the second contact list comprising a fourth account identifier associated with a fourth group account;

generating second list data representing the second contact list;

determining that the fourth group account has granted the authorization to the third group account;

generating second presence metadata indicating that human presence has been detected by a third electronic device associated with the fourth group account within the predefined amount of time of when the audio data was received;

sending the second list data to the first electronic device; and sending the second presence metadata to the first electronic device.

5. A method, comprising:

determining, using a first identifier, a first account associated with a first device;

determining a first contact list associated with the first account, the first contact list comprising at least a second identifier corresponding to a second account;

generating first list data representing the first contact list;

determining that the second account has granted authorization to the first account such that the first account is able to establish a voice communications session with a device associated with the second account without requiring the device associated with the second account to explicitly approve the voice communications session;

determining that at least the second account is associated with first presence data indicating that a human is in physical proximity to a second device associated with the second identifier;

generating first list metadata indicating the first presence data;

sending the first list metadata to the first device;

sending the first list data to the first device;

receiving, from the first device, input data;

determining, using the input data, a first request to initiate a voice communications session corresponding to the second identifier; and establishing, in response to the first request and based at least in part on determining that the second account has granted the authorization, a voice communications session between the first device and the second device.

6. The method of claim 5, further comprising:

receiving, prior to the first account being determined, a second request to display contact data associated with the first account, the second request being received from the first device.

7. The method of claim 5, further comprising:

receiving, prior to the first account being determined, audio data representing an utterance, the audio data being received from the first device;

generating text data representing the audio data; and determining, using the text data, that an intent of the utterance is a second request that contact data be displayed by the first device.

8. The method of claim 7, further comprising:

generating first acoustic features associated with the audio data;

generating vector data representing the first acoustic features;

determining a speaker identification confidence score indicating a how similar the vector data is to stored vector data representing second acoustic features associated with the first account;

determining that the speaker identification confidence score is greater than a speaker identification confidence threshold indicating that the utterance was spoken by a second user associated with the first account;

generating second list metadata indicating a frequent contact list comprising contact data associated with at least one frequently communicated with contact of the first contact list; and sending the second list metadata to the first device.

9. The method of claim 5, further comprising:

determining a second contact list, the second contact list comprising at least the second identifier and a third identifier associated with a third account, wherein the second account and the third account have granted permission to the first group account such that the first account is capable of communicating with at least one of the second account and the third account;

generating second list metadata indicating the second contact list; and sending the second list metadata to the first device.

10. The method of claim 5, further comprising:

obtaining, prior to the first contact list being determined, first contact data representing a second contact list associated with a second user of the first account; and obtaining second contact data representing a third contact list associated with a third user of the first account, the first contact list being determined by combining the second contact list and the third contact list.

11. The method of claim 5, further comprising:

receiving, from the first device and prior to the first account being determined, audio data representing an utterance that corresponds to a second request to display contact data associated with a second user located physically proximate to a third device associated with the second user;

generating first acoustic features associated with the audio data;

43 generating first vector data representing the first acoustic features;
determining a speaker identification confidence score indicating how similar the first vector data is to first stored vector data representing second acoustic features associated with the first account; and
determining that the speaker identification confidence score is greater than a speaker identification confidence threshold indicating that the utterance was spoken by a third user associated with the first account, wherein determining that the first account comprises determining that the audio data was spoken by the third user.

12. The method of claim 5, further comprising:
determining that the first contact list further comprises a third identifier associated with a third account;
determining, during a first period of time, that a first presence likelihood score associated with the third account is less than or equal to a presence confidence score threshold indicating a lack of human presence being detected by a third device associated with the third identifier;
determining, during a second period of time after a temporal end of the first period of time, that a second presence likelihood score associated with the third account is greater than the presence confidence score threshold;
generating second list metadata indicating second presence data, the second presence data indicating that an additional human is in physical proximity to the third device; and
sending the second list metadata to the first device.

13. The method of claim 5, further comprising:
receiving, from the first device, audio data representing an utterance including a second request to display contact data;
determining that the first contact list further comprises a third identifier associated with a third account;
generating first acoustic features associated with the audio data;
generating vector data representing the first acoustic features;
determining, based at least in part on a first speaker confidence score being greater than a predefined speaker confidence score threshold, that the utterance was spoken by a second user associated with a user account, the user account being associated with the third account;
determining a second contact list associated with the third account, the second contact list comprising at least a fourth identifier associated with a fourth account;
generating second list data representing the second contact list;
determining that at least the fourth account is associated with second presence data indicating that an additional human is in physical proximity to a fourth device associated with the fourth identifier;
generating second list metadata indicating the second presence data;
sending the second list metadata to the first device; and
sending the second list data to the first device.

14. The method of claim 5, wherein the input data is audio data representing an utterance, the method further comprising:
determining, using the audio data, that an intent of the utterance is the first request to initiate the voice communications session.

44

15. A computing system, comprising:
memory;
communications circuitry; and
at least one processor operable to:
determine, using a first identifier, a first account associated with a first device;
determine a first contact list associated with the first account, the first contact list comprising at least a second identifier corresponding to a second account;
generate first list data representing the first contact list;
determine that the second account has granted authorization to the first account such that the first account is able to establish a voice communications session with a device associated with the second account without requiring the device associated with the second account to explicitly approve the voice communications session;
determine that at least the second account is associated with first presence data indicating that a human is in physical proximity to a second device associated with the second identifier;
generate first list metadata indicating the first presence data;
send the first list metadata to the first device;
send the first list data to the first device;
receive, from the first device, input data;
determine, using the input data, a first request to initiate a voice communications session corresponding to the second identifier; and
establish, in response to the first request and based on determination that the second account has granted the authorization, a voice communications session between the first device and the second device.

16. The computing system of claim 15, wherein the at least one processor is further operable to:
receive, prior to the first account being determined, audio data representing an utterance, the audio data being received from the first device;
generate text data representing the audio data; and
determine, using the text data, that an intent of the utterance is a second request that contact data be displayed by the first device.

17. The computing system of claim 16, wherein the at least one processor is further operable to:
generate first acoustic features associated with the audio data;
generate vector data representing the first acoustic features;
determine a speaker identification confidence score indicating a how similar the vector data is to stored vector data representing second acoustic features associated with the first account;
determine that the speaker identification confidence score is greater than a speaker identification confidence threshold indicating that the utterance was spoken by a second user associated with the first account;
generate second list metadata indicating a frequent contact list comprising contact data associated with at least one frequently communicated with contact of the first contact list; and
send the second list metadata to the first device.

18. The computing system of claim 15, wherein the at least one processor is further operable to:
determine a second contact list, the second contact list comprising at least the second identifier and a third identifier associated with a third account, wherein the second account and the third account have granted permission to the first account such that the first account is capable of communicating with at least one of the second account and the third account;
generate second list metadata indicating the second contact list; and
send the second list metadata to the first device.

19. The computing system of claim 15, wherein the at least one processor is further operable to:
receive, from the first device and prior to the first account being determined, audio data representing an utterance that corresponds to a second request to display contact data associated with a second user located physically proximate to a third device associated with the second user;
generate first acoustic features associated with the audio data;
generate first vector data representing the first acoustic features;
determine a speaker identification confidence score indicating how similar the first vector data is to first stored vector data representing second acoustic features associated with the first account; and
determine that the speaker identification confidence score is greater than a speaker identification confidence threshold indicating that the utterance was spoken by a third user associated with the first account, wherein determining that the first account comprises determining that the audio data was spoken by the second third user.

20. The computing system of claim 15, wherein the at least one processor is further operable to:
determine that the first contact list further comprises a third identifier associated with a third account;
determine, during a first period of time, that a first presence likelihood score associated with the third account is less than or equal to a presence confidence score threshold indicating a lack of human presence being detected by a third device associated with the third identifier;
determine, during a second period of time after a temporal end of the first period of time, that a second presence likelihood score associated with the third account is greater than the presence confidence score threshold;
generate second list metadata indicating second presence data, the second presence data indicating that an additional human is in physical proximity to the third device; and
send the second list metadata to the first device.

21. The computing system of claim 15, wherein the at least one processor is further operable to:
receive, from the first device, audio data representing an utterance including a second request to display contact data;
determine that the first contact list further comprises a third identifier associated with a third account;
generate first acoustic features associated with the audio data;
generate vector data representing the first acoustic features;
determine, based at least in part on a first speaker confidence score being greater than a predefined speaker confidence score threshold, that the utterance was spoken by a second user associated with a user account, the user account being associated with the third account;
determine a second contact list associated with the third account, the second contact list comprising at least a fourth identifier associated with a fourth account;
generate second list data representing the second contact list;
determine that at least the fourth account is associated with second presence data indicating that an additional human is in physical proximity to a fourth device associated with the fourth identifier;
generate second list metadata indicating the second presence data;
send the second list metadata to the first device; and
send the second list data to the first device.

22. The computing system of claim 15, wherein the input data is audio data representing an utterance, and the at least one processor is further operable to:
determine, using the audio data, that an intent of the utterance is the first request to initiate the voice communications session.

* * * * *